US008130439B2

(12) United States Patent
Handschy et al.

(10) Patent No.: US 8,130,439 B2
(45) Date of Patent: Mar. 6, 2012

(54) OPTICS ARRANGEMENTS INCLUDING LIGHT SOURCE ARRANGEMENTS FOR AN ACTIVE MATRIX LIQUID CRYSTAL GENERATOR

(75) Inventors: Mark A Handschy, Boulder, CO (US); Michael R Meadows, Nederland, CO (US); Holden Chase, Lafayette, CO (US)

(73) Assignee: Micron Technology, Inc., Boise, ID (US)

( * ) Notice: Subject to any disclaimer, the term of this patent is extended or adjusted under 35 U.S.C. 154(b) by 1114 days.

(21) Appl. No.: 11/932,447

(22) Filed: Oct. 31, 2007

(65) Prior Publication Data

US 2008/0062351 A1   Mar. 13, 2008

Related U.S. Application Data

(60) Continuation of application No. 11/317,936, filed on Dec. 23, 2005, now abandoned, which is a continuation of application No. 10/067,516, filed on Feb. 4, 2002, now Pat. No. 7,012,730, which is a continuation of application No. 09/735,109, filed on Dec. 13, 2000, now Pat. No. 6,359,723, which is a continuation of application No. 09/422,815, filed on Oct. 21, 1999, now Pat. No. 6,195,136, which is a continuation of application No. 09/046,898, filed on Mar. 24, 1998, now Pat. No. 6,038,005, which is a division of application No. 08/362,234, filed on Dec. 22, 1994, now Pat. No. 5,808,800.

(51) Int. Cl.
*G02B 26/00* (2006.01)

(52) U.S. Cl. ........................................ 359/290

(58) Field of Classification Search .................. 359/290; 349/129, 123, 124, 130
See application file for complete search history.

(56) References Cited

U.S. PATENT DOCUMENTS 3,697,149 A   10/1972   Van Heeckeren et al.
(Continued)

FOREIGN PATENT DOCUMENTS

EP   0287034   4/1988
(Continued)

OTHER PUBLICATIONS

J.B. Eichenlaub "Development and Preliminary Evaluation of Field-Sequential Color LCD Free of Color Breakup;" 1994 SID Digest, pp. 293-296.

(Continued)

*Primary Examiner* — Joseph P Martinez
(74) *Attorney, Agent, or Firm* — Robert G. Crouch; Marsh Fischmann & Breyfogle LLP

(57) ABSTRACT

A system for producing modulated lights disclosed. The system comprises a spatial light modulator including a light modulating medium switchable between different states so as to act on light in ways which form overall patterns of modulated light. The system also includes an arrangement for switching the modulating medium between the different states in a controlled way and an illumination arrangement for producing a source of light. The system, further includes an optics arrangement for directing light from the source of light into the spatial light modulator and for directing light from the spatial light modulator through a predetermined source imaging area. The optics arrangement cooperates with the illumination arrangement and the spatial light modulator so as to produce a real image of the source of light within the source imaging area such that an individual is able to view a virtual image of the overall patterns of modulated light from the source imaging area. A variety of novel optics arrangements are disclosed including specific combinations of different light sources, diffusing plates, polarizers, beam splitters, analyzers, lenses, mirrors, and holographic optical elements which allow the overall optical arrangement to be miniaturized to the same degree and in coordination with the spatial light modulator. The different light sources include using a plurality of light sources, such as LEDs, to form an array of light sources, each of the light sources providing light to a corresponding portion of the spatial light modulator.

23 Claims, 10 Drawing Sheets

U.S. PATENT DOCUMENTS

| | | | |
|---|---|---|---|
| 3,854,751 | A | 12/1974 | Haas et al. |
| 3,862,360 | A | 1/1975 | Dill et al. |
| 3,875,456 | A | 4/1975 | Kano et al. |
| 4,009,414 | A | 2/1977 | Bockett-Pugh |
| 4,074,319 | A | 2/1978 | Goldschmidt et al. |
| 4,090,219 | A | 5/1978 | Ernstoff |
| 4,092,057 | A | 5/1978 | Walton |
| 4,229,095 | A | 10/1980 | Mir |
| 4,239,346 | A | 12/1980 | Lloyd |
| 4,378,568 | A | 3/1983 | Mir |
| 4,441,755 | A | 4/1984 | Endo et al. |
| 4,508,429 | A | 4/1985 | Nagae et al. |
| 4,566,758 | A | 1/1986 | Bos |
| 4,595,259 | A | 6/1986 | Perregaux |
| 4,634,226 | A | 1/1987 | Isogai et al. |
| 4,655,550 | A | 4/1987 | Crossland et al. |
| 4,709,995 | A | 12/1987 | Kuribayashi et al. |
| 4,720,706 | A | 1/1988 | Stine |
| 4,767,172 | A | 8/1988 | Nichols et al. |
| 4,784,791 | A | 11/1988 | Saito |
| 4,840,462 | A | 6/1989 | Hartmann |
| 4,864,290 | A | 9/1989 | Waters |
| 4,865,427 | A | 9/1989 | Kingston et al. |
| 4,874,228 | A | 10/1989 | Aho et al. |
| 4,907,862 | A | 3/1990 | Suntola |
| 4,921,334 | A | 5/1990 | Akodes |
| 4,922,240 | A | 5/1990 | Duwaer |
| 4,932,757 | A * | 6/1990 | Hanyu et al. ............... 349/138 |
| 4,941,735 | A | 7/1990 | Moddel et al. |
| 4,958,915 | A | 9/1990 | Okada et al. |
| 4,965,561 | A | 10/1990 | Havel |
| 4,968,119 | A | 11/1990 | Stewart |
| 4,969,119 | A | 11/1990 | Kurokawa et al. |
| 4,976,515 | A | 12/1990 | Hartmann |
| 4,978,952 | A | 12/1990 | Irwin |
| 4,999,619 | A * | 3/1991 | Te Velde ............... 349/167 |
| 5,005,951 | A | 4/1991 | Te Velde |
| 5,008,788 | A | 4/1991 | Palinkas |
| 5,011,269 | A | 4/1991 | Wakita et al. |
| 5,034,736 | A | 7/1991 | Bennett et al. |
| 5,053,764 | A | 10/1991 | Barbier et al. |
| 5,056,895 | A | 10/1991 | Kahn |
| 5,061,049 | A | 10/1991 | Hornbeck |
| 5,065,502 | A | 11/1991 | Amante |
| 5,073,010 | A | 12/1991 | Johnson et al. |
| 5,083,857 | A | 1/1992 | Hornbeck |
| 5,091,722 | A | 2/1992 | Kitajima et al. |
| 5,093,652 | A | 3/1992 | Bull et al. |
| 5,096,279 | A | 3/1992 | Hornbeck |
| 5,122,791 | A | 6/1992 | Gibbons et al. |
| 5,128,773 | A | 7/1992 | Sato |
| 5,128,782 | A | 7/1992 | Wood |
| 5,146,356 | A | 9/1992 | Carlson |
| 5,151,718 | A | 9/1992 | Nelson |
| 5,157,524 | A | 10/1992 | Dijon et al. |
| 5,170,156 | A | 12/1992 | DeMond et al. |
| 5,178,445 | A | 1/1993 | Moddel et al. |
| 5,189,406 | A | 2/1993 | Humpheries et al. |
| 5,192,946 | A | 3/1993 | Thompson et al. |
| 5,206,629 | A | 4/1993 | DeMond et al. |
| 5,214,420 | A | 5/1993 | Thompson et al. |
| 5,225,823 | A | 7/1993 | Kanaly |
| 5,233,338 | A | 8/1993 | Surguy |
| 5,233,385 | A | 8/1993 | Sampsell |
| 5,233,447 | A | 8/1993 | Kuribayashi et al. |
| 5,238,435 | A | 8/1993 | Te Velde |
| 5,239,227 | A | 8/1993 | Kikinis |
| 5,245,369 | A | 9/1993 | Um et al. |
| 5,245,455 | A | 9/1993 | Sayyah et al. |
| 5,254,980 | A | 10/1993 | Hendrix et al. |
| 5,255,100 | A | 10/1993 | Urbanus |
| 5,278,652 | A | 1/1994 | Urbanus et al. |
| 5,278,680 | A | 1/1994 | Karasawa et al. |
| 5,280,277 | A | 1/1994 | Hornbeck |
| 5,285,308 | A | 2/1994 | Jenkins et al. |
| 5,287,096 | A | 2/1994 | Thompson et al. |
| 5,298,915 | A | 3/1994 | Bassetti, Jr. |
| 5,303,055 | A | 4/1994 | Hendrix et al. |
| 5,309,523 | A | 5/1994 | Iwaki et al. |
| 5,315,419 | A | 5/1994 | Saupe et al. |
| 5,337,068 | A | 8/1994 | Stewart et al. |
| 5,339,090 | A | 8/1994 | Crossland et al. |
| 5,339,116 | A | 8/1994 | Urbanus et al. |
| 5,349,366 | A | 9/1994 | Yamazaki et al. |
| 5,359,345 | A | 10/1994 | Hunter |
| 5,365,283 | A | 11/1994 | Doherty et al. |
| 5,383,041 | A | 1/1995 | Yamazaki et al. |
| 5,384,649 | A | 1/1995 | Takimoto et al. |
| 5,387,953 | A | 2/1995 | Minoura et al. |
| 5,416,496 | A | 5/1995 | Wood |
| 5,420,602 | A | 5/1995 | Kanazawa |
| 5,436,742 | A | 7/1995 | Tanaka et al. |
| 5,444,557 | A | 8/1995 | Spitzer et al. |
| 5,448,314 | A | 9/1995 | Heimbuch et al. |
| 5,461,397 | A | 10/1995 | Zhang et al. |
| 5,465,168 | A | 11/1995 | Koden et al. |
| 5,467,146 | A | 11/1995 | Huang et al. |
| 5,467,215 | A | 11/1995 | Lebby et al. |
| 5,483,307 | A | 1/1996 | Anderson |
| 5,485,318 | A | 1/1996 | Lebby et al. |
| 5,497,172 | A | 3/1996 | Doherty et al. |
| 5,497,433 | A | 3/1996 | Itoh et al. |
| 5,499,062 | A | 3/1996 | Urbanus |
| 5,500,538 | A | 3/1996 | Yamazaki et al. |
| 5,504,514 | A | 4/1996 | Nelson |
| 5,506,597 | A | 4/1996 | Thompson et al. |
| 5,519,520 | A | 5/1996 | Stoller |
| 5,523,803 | A | 6/1996 | Urbanus et al. |
| 5,523,864 | A | 6/1996 | Gaalema et al. |
| 5,539,554 | A | 7/1996 | Lebby et al. |
| 5,548,301 | A | 8/1996 | Kornher et al. |
| 5,557,353 | A * | 9/1996 | Stahl ............... 353/69 |
| 5,566,010 | A | 10/1996 | Ishii et al. |
| 5,568,315 | A | 10/1996 | Shuman |
| 5,580,156 | A | 12/1996 | Suzuki et al. |
| 5,589,852 | A | 12/1996 | Thompson et al. |
| 5,606,342 | A | 2/1997 | Shoji et al. |
| 5,610,624 | A | 3/1997 | Bhuva |
| 5,612,708 | A | 3/1997 | Ansley et al. |
| 5,627,672 | A | 5/1997 | Rhoads et al. |
| 5,635,997 | A | 6/1997 | Lewis |
| 5,640,214 | A | 6/1997 | Florence |
| 5,648,860 | A | 7/1997 | Ooi et al. |
| 5,673,010 | A | 9/1997 | Dusseux et al. |
| 5,703,664 | A | 12/1997 | Jachimowicz et al. |
| 5,705,424 | A | 1/1998 | Zavracky et al. |
| 5,717,418 | A | 2/1998 | Shapiro et al. |
| 5,748,164 | A | 5/1998 | Handschy et al. |
| 5,754,344 | A | 5/1998 | Fujiyama |
| 5,757,348 | A | 5/1998 | Handschy et al. |
| 5,764,329 | A | 6/1998 | Chen et al. |
| 5,771,124 | A | 6/1998 | Kintz et al. |
| 5,808,800 | A | 9/1998 | Handschy et al. |
| 5,847,868 | A | 12/1998 | Palmer |
| 5,853,240 | A | 12/1998 | Tanaka et al. |
| 5,905,482 | A | 5/1999 | Hughes et al. |
| 5,912,651 | A | 6/1999 | Bitzakidis et al. |
| 5,959,598 | A | 9/1999 | McKnight |
| 5,986,815 | A | 11/1999 | Bryars |
| 6,008,946 | A | 12/1999 | Knowles |
| 6,038,005 | A | 3/2000 | Handschy et al. |
| 6,094,187 | A | 7/2000 | Jones et al. |
| 6,300,924 | B1 | 10/2001 | Markandey et al. |
| 6,348,907 | B1 | 2/2002 | Wood |
| 6,388,649 | B1 | 5/2002 | Tanaka et al. |
| 6,570,550 | B1 | 5/2003 | Handschy et al. |
| 7,170,483 | B2 | 1/2007 | Handschy et al. |
| 2002/0009890 | A1 | 1/2002 | Hayase et al. |

FOREIGN PATENT DOCUMENTS

EP 0142326 4/2007

OTHER PUBLICATIONS

John C. White "Colour LCD TV" Phys. Technol. 19 (1989) pp. 91-100.

J.B. Sampsell "An Overview of the Performance Envelope of Digital-Micromirror-Device-Based Projection Display Systems;" 1994 SID Digest pp. 669-672.

Mark A. Handschy, Lisa K. Cotter, Jim D. Cunningham, Timothy J. Drabik, and Stephen D. Gaalema, "One-Transistor DRAM FLC/VLSI SLM", Mar. 15, 1993, spatial Light Modulators and Applications Technical Digest 1993 (Summaries of papers presented at the Spatial Light Modulators and Applications Topical Meeting, Mar. 15-17, 1993), Optical Society of America, Washington, D.C. 1993, vol. 6, pp. 14-17.

W. A. Crossland, M. J. Birch, D. G. Vass, I. Underwood, S. A. Reid and S. G. Latham, "Silicon Active Backplane Spatial Light Modulators Using Ferroelectric Liquid Crystals", Sep. 10, 1990, Spatial Light Modulators and Applications—1990 Technical Digest Series, vol. 14 (Summaries of papers presented at the Spatial Light Modulators and Applications Topical Meeting, Sep. 10-12, 1990), Optical Society of America, Washington, D.C. 1990, vol. 14, pp. 94-97.

Mark A. Handschy and Timothy J. Drabik, "Process in Silicon VLSI/Ferroelectric-Liquid-Crystal Micro-Power Optoelectronic Computing Devices", Sep. 10, 1990, Spatial Light Modulators adn Applications—1990 Technical Digest Series, vol. 14 (Summaries of papers presented at the Spatial Ight Modulators and Applications Topical Meeting, Sep. 10, 12, 1990), Optical Society of America, Washington, D.C. 1990, vol. 14 pp. 98-100.

Juris Upatnieks, "Edge-Illuminated Holograms"; Mar. 10, 1992; Optics 31, (8) 1048.

C. Carre, S. Habraken and St. Roose, "Computer-Originated Polarizing Holographic Optical Element Recorded in Photopolymerizable Layers", May 1, 1993; Opt. Lett. 18, (9) 738.

L. D. Dickson, R. D. Rallison and B. H. Yung, "Holographic Polarization-Separation Elements"; Aug. 10, 1994; Applied Optics 33, (23) 5378-5385.

L. K. Cotter, T. J. Drabik, R. J. Dillon and M. A. Handschy, "Ferroelectric-Liquid-Crystal Silicon-Integrated-Circuit Spatial Light Modulator"; Mar. 1, 1990; Opt. Lett. 15, 191.

I. Underwood, et al., "A High Performance Spatial Light Modulator"; Jul. 21, 1991; SPIE vol. 1562, 107.

W. A. Crossland, M. J. Birch, A. B. Davey and D. G. Vass; "Active Backplane Spatial Light Modulators Using Chiral Smectic Liquid Crystals"; Feb. 9, 1992; SPIE vol. 1665, 114.

David Armitage, "Ferroelectric Liquid-Crystal Gray-Scale Response", 1991, Mol. Cryst. Liq. Cryst., vol. 199, pp. 97-110.

David Armitage and Donald K. Kinell, "Liquid-Crystal Integrated Silicon Spatial Light Modulator", Jul. 10, 1992, Applied Optics, vol. 31, No. 20, pp. 3945-3949.

Mark A. Handschy, Michael J. O'Callaghan, Michael D. Wand and Stephen D. Gaalema, "Analog electro-optic modulators for ferroelectric-liquid-crystal/VLSI spatial light modulators", SPIE, vol. 1911, pp. 175-180.

W. J. A. M. Hartmann, "Ferroelectric Liquid-Crystal Video Display", Sep. 1989. IEEE Transactions on Electron Devices, vol. 36, No. 9, pp. 1895-1899.

W. J. A. M. Hartmann, "Ferroelectric Liquid Crystal Video Display", 1988, IEEE 1988 International Display Research Conference, pp. 191-194.

W. J. A. M. Hartmann, "Charge-controlled phenomena in the surface-stabilized ferroelectric liquid-crystal structure", Aug. 1, 1989, J. Appl. Phys. 66 (3), pp. 1132-1136.

W. J. A. M. Hartmann, A. G. H. Verhulst, J. A. M. M. Van Haaren and F. J. J. Blommaert, "The possibilities of ferroelectric liquid crystals for video displays", 1993, Journal of the SID, 1/3, pp. 255-258.

David A. Jared and Kristina M. Johnson, "Optically addressed thresholding very-large scale-integration/liquid-crystal", Jun. 15, 1991, Optics Letters, vol. 16, No. 12, pp. 967-969.

S. T. Lagerwall, N. A. Clark, J. Dijon and J. F. Clerc, "Ferroelectric Liquid Crystals: The Development of Devices", 1989, Ferroelectrics, vol. 94, pp. 3-62.

N. A. Clark, S. T. Lagerwall and J. Wahl, "Fast and Bistable Electro-Optic Display Using Ferroelectric Liquid Crystals".

N. A. Clark, S. T. Lagerwall and J. Wahl, "Modulators, Linear Arrays, and Matrix Arrays Using Ferroelectric Liquid Crystals", 1985, Proceedings of the SID, vol. 26/2, pp. 133=139.

S. T. Lagerwall, J. Wahl and N. A. Clark, "Ferroelectric Liquid Crystals for Displays", 1985, IEEE, pp. 213-221.

N. A. Clark, M. A. Handschy and S. T. Lagerwall, "Ferroelectric Liquid Crystal Electro-Optics Using the Surface Stabilized Structure", 1983, Mol. Cryst. Liq. Cryst., vol. 94, pp. 213-234.

K. Sharp, M. Matuszcyk, B. Bijlenga, A. Hornell, B. Stebler and S. T. Lagerwall, "A 1"×0.5" FLC Bar-Graph Display with Short-Term Memory", 1988, Ferroelectrics, vol. 85, pp. 313-325.

J. Wahl and S. C. Jain, "Bistable Electro-Optic Switching of a Ferroelectric Liquid Crystal (HOBACPC)", 1984, Ferroelectrics, vol. 59, pp. 161-179.

P. D. Berezin, L. M. Blinov, I. N. Kompanets, and V . V. Nikitin, "Electrooptic Switching in Oriented Liquid-Crystal Films", Jul.-Aug. 1973, Sov. J. Quant. Electron, vol. 3, No. 1.

H. K. Bucher, R. T. Dlingbiel and J. P. VanMeter, "Frequency-Addressed Liquid Crystal Field Effect", Aug. 15, 1974, Applied Physics Letters, vol. 25, No. 4.

J. W. Doane, N. A. Vaz, B. -G. Wu, and S. Zumer, "Field Controlled Light Scattering from Nematic Microdroplets", Jan. 27, 1986, Appl. Phys. Lett. 48 (4).

J. Glueck, E. Lueder, T. Kallfass, and H. -U. Lauer, "15.4: Color-TV Projection with Fast-Switching Reflective HAN-Mode Light Valves", SID 92 Digest, pp. 277-280.

Douglas J. McKnight, David G. Vass, and Richard M. Sillitto, "Development of a spatial light modulator: a randomly addressed liquid-crystal-over-nMOS array", Nov. 15, 1989, Applied Optics, vol. 28, 1989.

A. E. Perregaux, J. F. Stephany, E. C. Faucz, R. A. Hudson, V. J. Hull, A. I. Lakatos, R. A. Martel, R. Narang, and B. Richter, "Transient Nematic Liquid Crystal Image Bar for Electrophotographic Printers".

Rolf Vatne, Philip A. Johnson, Jr., and Philip J. Bos, "6.1/11:00 A.M.: A LC/CERT Field-Sequential Color Display", SID 83 Digest, pp. 28-29.

Keyvan Sayyah, Chiung-Sheng Wu, Shin-Tson Wu, and Uzi Efron, "Anomalous liquid crystal undershoot effect resulting in a nematic liquid crystal-based spatial light modulator with one millisecond response time", Aug. 24, 1992, Appl. Phys. Lett. 61 (8).

Shin-Tson Wu and Anna M. Lackner, "Mylar-film-compensated π and parallel-aligned liquid crystal cells for direct-view and protection displays", Apr. 18, 1994, Appl. Phys. Lett. 64 (16).

Shin-Tson Wu, "Nematic liquid crystal modulator with response time less than 100 μs at room temperature", Sep. 3, 1990, Appl. Phys. Lett. 57 (10).

D. C. Burns, I. Underwood, and A. F. Murray, "An Optoelectronic Neural Network with Temporally Multiplexed Grey-Scale Weights", 1994, IEEE, pp. 3-7.

Ian Underwood, David G. Vass, Antony O'Hara, Dwayne C. Burns, Peter W. McOwan, and James Gourlay , "Improving the performance of liquid-crystal-over-silicon spatial light modulators: issues and achievements", May 10, 1994, Applied Optics, vol. 33, No. 14, pp. 2768-2774.

Ronald J. Lewandowski, Wendell Stephens Loran A. Haworth, "Helmet- and Head-Mounted Displays and Symbology Design Requirements", SPIE, vol. 2218, pp. 17-24.

Randy L. Shimabukuro, S. D. Russell and Bruce W. Offord, "Ultrathin silicon on sapphire for high-density AMLCD drivers", SPIE, vol. 2174 pp. 82-90.

Philip J. Boss and K. Rickey Koehler/Beran, "The pi-Cell: A fast Liquid-Crystal Optical-Switching Device", 1984, Mo. Cryst. Liq. Cryst., vol. 113, pp. 329-339.

G. Baur, A. Stieb, G. Meier, "Controlled decay of electrically induced deformations in nematic liquid crystals", Dec. 31, 1973, Applied Physics A: Materials Science & Processing, vol. 2, pp. 349-350.

Hiap Liew Ong, "Frame Sequential Color Thin Film Transistor/Liquid Crystal Displays: Display Characteristics and Grayscale Consideration", Sep. 1993, Jpn. J. Appl. Phys. vol. 32 (1993), pp. 3879-3885.

D. L. Jose, R. G. Stewart, W. R. Roach, "A Novel Large Area Color LCD Backlight System", Aerospace and Electronics Conference, IEEE 1990, pp. 275-277.

J.C. White, "Colour LCD TV," May 1988, Physics in Technology, vol. 19, No. 3, p. 91-100.

E.V. Stine and M.Chmielowski; "High-Refresh-Rate Color Sequenced LCD;" Jun. 14, 1994; SID Digest of Technical Papers 25, p. 544.

J.P. Sampsell; "An Overview of the Performance Envelope of Digital-Micromirror-Device-Based Projection Display Systems;" Jun. 14, 1994; SID Digest of Technical Papers 25, 669.

Michael D. Wand, Rhini Vohra, Mike O'Callaghan, Beth Roberts, and Claus Escher, "An Easily Aligned Deformable Helix Ferroelectric Liquid Crystal Mixture and Its Use in Devices," 1992, SPIE Proceedings, 1992, vol. 1665-16, pp. 176-183.

D.L. Jose, R.G. Stewart, W.R. Roach, David Sarnoff "A Novel Large Area Color LCD Backlight System;" Jan. 1990, IEEE pp. 275-277.

S-T. Wu, A.M. Lackner "Film-Compensated Parallel-Aligned Cells for High-Speed LCDs;" 1994 SID Digest, pp. 923-926.

E.V. Stine, M. Chmielowski "High-Refresh-Rate Color Sequenced LCD;" 1994 SID Digest pp. 544-545.

Michael D. Wand, Rohini Vohra, Mike O'Callaghan, Beth Roberts, Claus Escher "An Easily Aligned Deformable Helix Ferroelectric Liquid Crystal Mixture and its Use in Devices;" SPIE Proceedings, 1992, 1665-16, pp. 176-183.

* cited by examiner

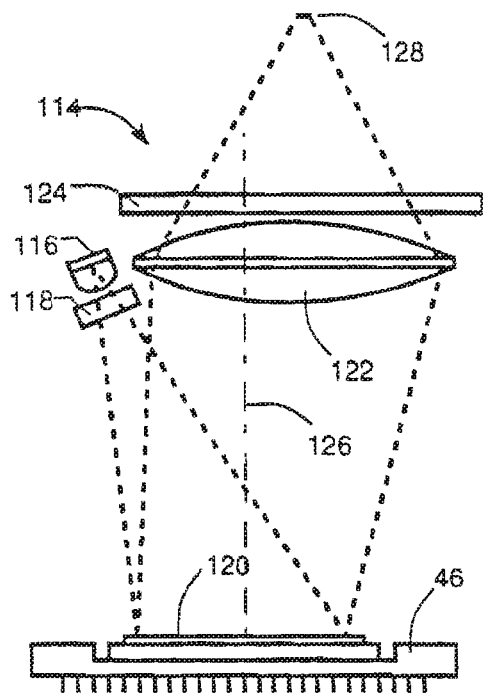
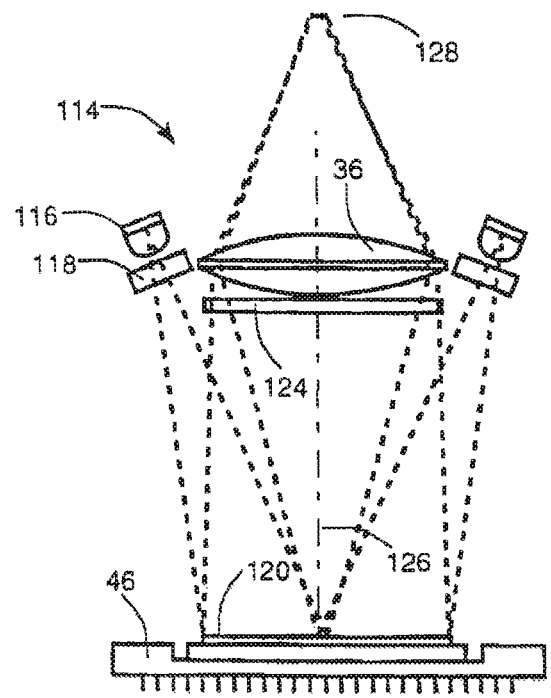
Figure 14A    Figure 14B
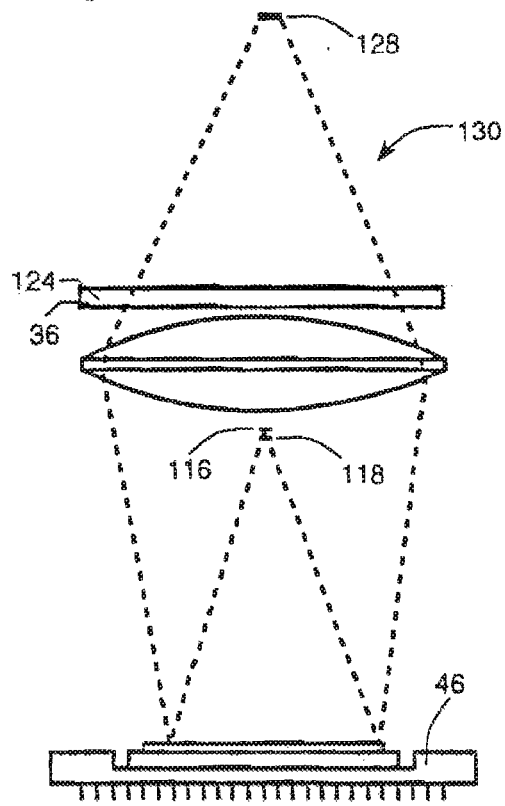
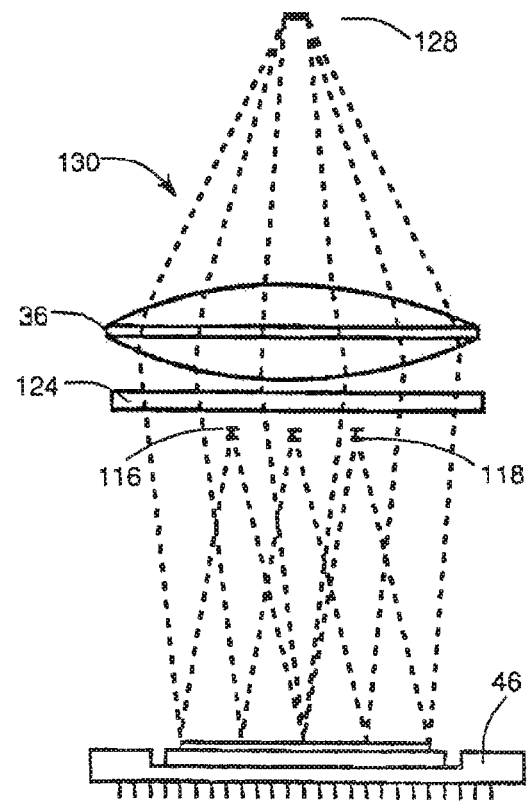
Figure 15A    Figure 15B

OPTICS ARRANGEMENTS INCLUDING LIGHT SOURCE ARRANGEMENTS FOR AN ACTIVE MATRIX LIQUID CRYSTAL GENERATOR

GOVERNMENT CONTRACT CLAUSE

This invention was made with Government support under contracts NAS9-18858 and NAS9-19102 awarded by the National Aeronautics and Space Administration and contracts DAA-H01-92-C-R275 and DAA-H01-94-C-R154 awarded by the Advanced Research Projects Agency. The Government has certain rights in this invention.

BACKGROUND OF THE INVENTION

The present invention relates generally to image generating systems, and more particularly to optics arrangements and light source arrangements especially suitable for miniaturized image generating systems such as the miniaturized image generator disclosed in U.S. Pat. No. 5,748,164 entitled ACTIVE MATRIX LIQUID CRYSTAL IMAGE GENERATOR, which is incorporated herein by reference.

One of the ongoing challenges facing the manufacture of miniature image generating systems is providing smaller and smaller systems. Miniature image generating systems which are small enough to be mounted onto a helmet or small enough to be supported by a pair of eyeglasses will find a wide variety of uses if they can provide adequate resolution and brightness in a small, low-power package at a low cost. Conventional technologies such as CRTs are difficult to miniaturize and therefore do not hold much promise in this field. Alternatively, new systems based on VLSI integrated circuits are currently being developed which provide much smaller spatial light modulators for use in a miniaturized image generating systems. However, one of the problems in this field is providing optics and illuminating arrangements which may be scaled down in coordination with the miniaturized spatial light modulator in order to provide an overall image generating system which is practical and compact enough to be mounted onto a helmet or supported by a pair of glasses. Another problem in this field is providing an illuminating arrangement which requires as little power as possible in order to make the overall system more portable.

Referring to FIG. 1, a prior art miniature image generator system generally designated by reference numeral 10 will be described. System 10 includes a transmissive spatial light modulator 12 which modulates light from a light source 14 positioned immediately adjacent to spatial light modulator 12 by selectively changing the polarization of light passing through the spatial light modulator. A polarizer 16 is positioned between light source 14 and spatial light modulator 12 which allows light of one polarization from light source 14 to enter spatial light modulator 12. An analyzer 18 is positioned adjacent to the opposite side of spatial light 12 which allows light of a particular polarization to pass through analyzer 18. An eyepiece lens 20 having a focal length F1 is positioned approximately one focal length F1 from spatial light modulator 12 such that a viewer may see a virtual image of the pattern of modulated light formed by spatial light modulator 12 when the viewer's eye is positioned in an appropriate location. As shown in FIG. 1, this arrangement results in a viewing region indicated by reference numeral 22 from which a viewer may view the entire virtual image of the pattern of modulated light produced by the spatial light modulator display.

In the above described arrangement, since light source 14 is positioned adjacent to spatial light modulator 12, light source 14 must have a light emitting surface with essentially the same surface area as spatial light modulator 12. Also, in order for the optics to perform properly, the light source is a diffuse light source. However, these requirements causes two major problems. First, a large diffuse light source as described above is substantially more expensive than other types of light sources. Second, because light source 14 is diffuse, a large percentage of the light generated by light source 14, indicated by lines 24, is directed to areas which are not within viewing region 22 including areas in which the light does not pass through eyepiece lens 20. This wastes a large percentage of the light produced by light source 14 and requires much more light to be produced than would be necessary if substantially all of the available light were directed into viewing region 22. This wastage of light significantly increases the power requirements of the overall system. As will be seen hereinafter, the present invention provides a variety of novel optics arrangements including novel light source arrangements which, when combined with miniaturized spatial light modulators, are capable of providing low power, compact miniaturized image generating system is that may be used to produce a direct view miniature display.

SUMMARY OF THE INVENTION

As will be described in more detail hereinafter, a system for producing modulated light is disclosed. The system comprises a spatial light modulator including a light modulating medium switchable between different states so as to act on light in ways which form overall patterns of modulated light. The system also includes means for switching the modulating medium between the different states in a controlled way and illumination means for producing a source of light. The system further includes optics means for directing light from the source of light into the spatial light modulator and for directing light from the spatial light modulator through a predetermined source imaging area. The optics means cooperates with the illumination means and the spatial light modulator so as to produce a real image of the source of light within the source imagine area such that an individual is able to view a virtual image of the overall patterns of modulated light from the source imaging area.

In one preferred embodiment of the present invention the spatial light modulator is a reflective type spatial light modulator and the optics means cooperate with said illumination means and said spatial light modulator such that some of the light passing from the illumination means to the spatial light modulator overlaps with some of the light passing from the spatial light modulator to the source imaging area.

In another embodiment of the present invention, the light source is provided by means of an array of light emitting sources such as LEDs (light emitting diodes) spaced apart by a predetermined distance. These spaced apart light sources, in combination with the optical components, produce an equal plurality of images at the source imaging area which are spaced apart from one another by a predetermined distance. The optical components of this embodiment may include a single collimating lens disposed optically between the light sources and the spatial light modulator, or alternatively, may include a plurality of collimating lenses, each of which is disposed optically between an associated one of the light sources and the spatial light modulator so as to direct light from its associated light source to a corresponding portion of the spatial light modulator.

In the case of a plurality of collimating lenses, the optical components also include a single eyepiece lens which is disposed optically between the spatial light modulator and the source imaging area and which defines a much greater focal length than the focal length of each of the individual collimating lenses. Also, the light sources may be disposed optically approximately a focal length away from their associated collimating lens, such that the plurality of images produced at the source imaging area are substantially larger than their respective light sources. Alternatively, in this arrangement, the light sources are disposed optically slightly closer to their associated collimating lens than one focal length so as to cause each collimating lens to direct light from its associated light source to the spatial light modulator in a slightly diverging manner. The spatial relationship between the light sources and the divergence of the light from the collimating lenses are such that the plurality of images produced at the source imaging area overlap one an other in a predetermined way.

The plurality of light sources may be provided in a variety of arrangements, in a first arrangement, the arrangement includes a single dielectric substrate having on one surface a pattern of electrically conductive leads adapted for connection to a source of electric power. A plurality of LEDs are individually attached to the substrate and electrically connected with the pattern of leads. An equal plurality of individual collimating lenses are attached to the substrate and disposed optically over associated ones of the LEDs. In a second arrangement, the arrangement includes a single LED wafer having on one surface a pattern of electrically conductive leads adapted for connection to a source of electric power. The pattern of leads divides the wafer into the plurality of LEDs. An equal plurality of individual collimating lenses may be attached to the wafer and disposed optically over associated ones of the LEDs. Alternatively the arrangement includes a single substrate which is attached to the LED wafer and which is integrally formed to define an associated collimating lens for each of the LEDs. In a third arrangement which may be any combination of the first and second arrangement, the plurality of LEDs include LEDs of different colors thereby providing a color version of the miniaturized assembly.

In a color version of the present invention, the light sources include different color light sources, such as LEDs, which are spaced apart a predetermined distance d and which emit light outwardly at a maximum angle A. A light diffusing plate is spaced from the light sources a distance L. Thus, the positional relationship between the light sources and the diffusing plate is such that L is at least approximately equal to d/A. In this way, as will be seen, it is possible to obtain proper registration of the different color images even though the light sources are spaced apart from one another.

As will be described in more detail hereinafter, a variety of specific arrangements for the optical components of the system for producing modulated light are also disclosed. These arrangements include specific combinations of a variety of light sources, polarizers, beam splitters, analyzers, lenses, mirrors, and holographic optical elements arranged to direct the light from the light source into the spatial light modulator and from the spatial light modulator to the source imaging area.

BRIEF DESCRIPTION OF THE DRAWINGS

The features of the present invention may best be understood by reference to the following description of the presently preferred embodiments together with the accompanying drawings in which:

FIG. 14A and 14B are diagrammatic side views of a seventh embodiment of a miniaturized image generating system designed in accordance with the present invention in which the spatial light modulator is directly illuminated by the light source without other optics components for directing the light into the spatial light modulator;

FIG. 15A and 15B are diagrammatic side views of an eighth embodiment of a miniaturized image generating system designed in accordance with the present invention in which the spatial light modulator is directly illuminated by the light source without other optics components for directing the light Into the spatial light modulator and the light source is positioned between the spatial light modulator and the eyepiece lens;

DETAILED DESCRIPTION OF THE PREFERRED EMBODIMENTS

Figure 2A:
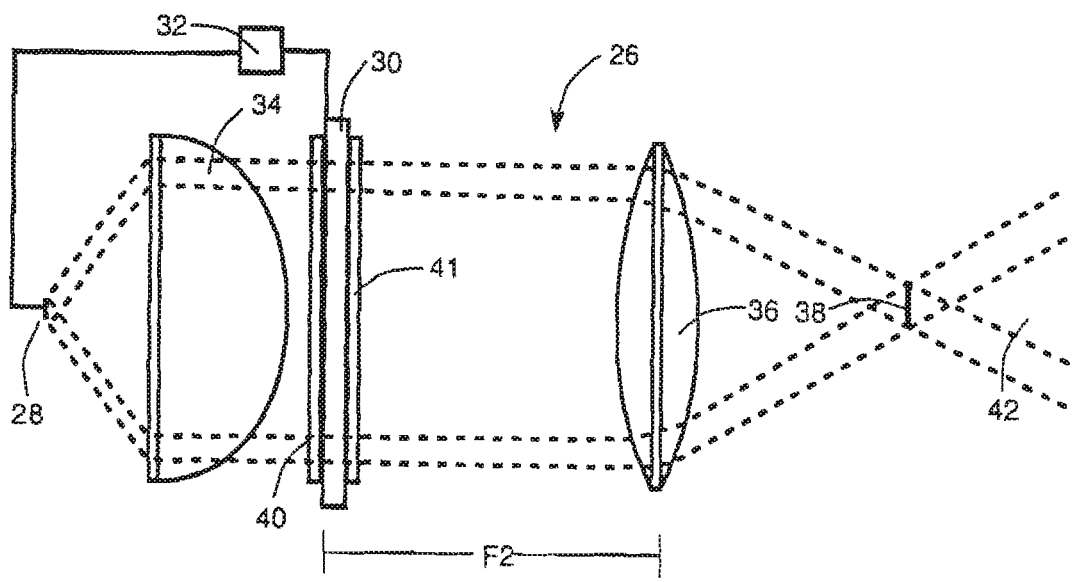
FIG. 2A is a diagrammatic side view of a miniature image generating system designed in accordance with the present invention having a light source positioned away from the spatial light modulator and including optical elements which form a real image of the light source at a source imaging area and allow a viewer to view a virtual image of a pattern of modulated light formed by a spatial light modulator when the pupil of the viewer's eye is positioned in the source imaging area.

Turning to FIGS. 2-18, wherein like components are designated by like reference numerals throughout the various Figures, attention is initially directed to FIG. 2A. This Figure illustrates the general optical elements of an optical system, designed in accordance with the present invention, for an image generating system, or miniaturized assembly for producing modulated light, including a spatial light modulator. In this case, the system is a miniature display system generally indicate, by reference numeral 26. As shown in FIG. 2A, a suitable and readily providable light source 28 is positioned away from a transmissive spatial light modulator 30 having an writing arrangement 32 for controlling the light modulating states of spatial light modulator 30. Writing arrangement 32 may also switchably control light source 28. Spatial light modulator 30 modulates light from light source 28 by selectively changing the polarization of the light passing through the spatial light modulator in response to data signal from writing arrangement 32. A collimating lens 34 is positioned between light source 28 and spatial light modulator 30 and an eye piece lens 36 is positioned between spatial light modulator 30 and a source imaging area 38 such that substantially all of the light generated by light source 28 is directed through source imaging area 38 except for any light which is specifically absorbed by or directed away from source imaging area 38 by other optical elements positioned within the optical path between light source 28 and source imagining area 38 such as, for example a polarizer 40 or an analyzer 41. Eyepiece lens 36 having a focal length F2 is positioned one focal length F2 from spatial light modulator 30 and cooperates with light source 28, collimating lens 34, and spatial light modulator 30 to form a real image of light source 28 at source imaging area 38 such that a virtual image of the pattern of modulated light from spatial light modulator 30 is directly visible by a viewer from a viewing region 42. The real image of light source 28 is formed at source imaging area 38 because light source 28 is positioned a distance more than F2, the focal length of eyepiece lens 36, from eyepiece lens 36.

The above described arrangement illustrated in FIG. 2A has the advantage over the prior art of directing a much greater percentage of the light from light source 28 through source imaging area 38 and into viewing region 42. This significantly reduces the power requirement for the light source since the wastage of light described above for the prior art arrangement is significantly reduced if not eliminated. Also, a system designed in accordance with the present invention allows a wide variety of light sources to be used including light sources which are substantially less expensive than the large diffuse light source 14 used in the prior art system. However, this particular arrangement shown in FIG. 2A substantially increases the overall length of the system and therefore is not practical when miniaturization of the overall system is important.

Figure 2B:
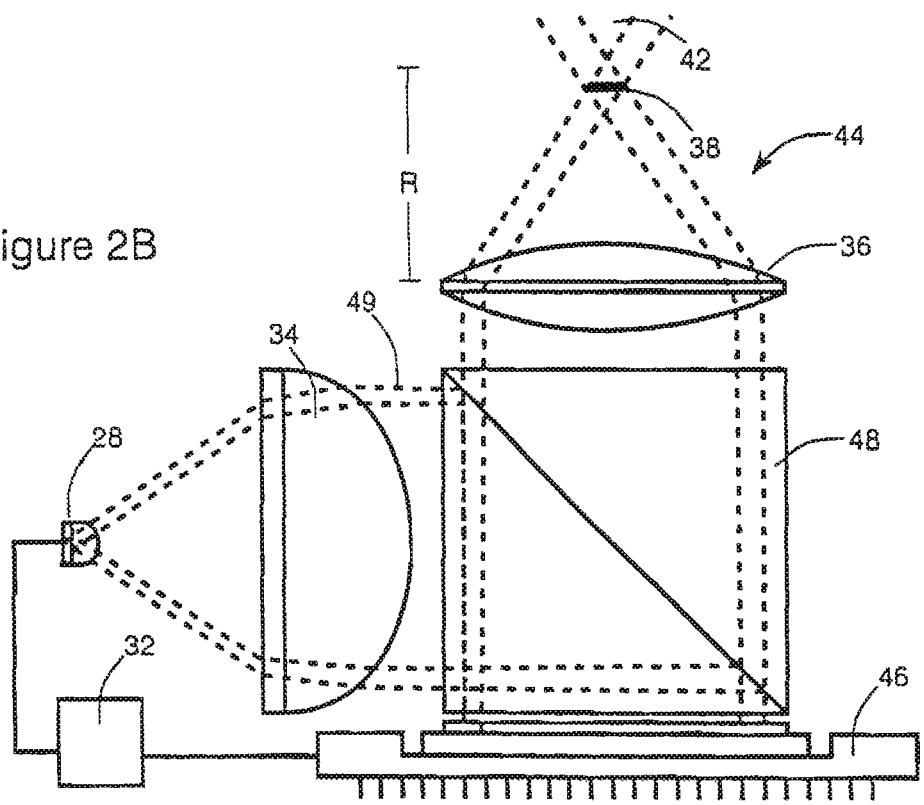
FIG. 2B is a diagrammatic side view of a basic reflective type miniaturized image generating system designed in accordance with the present invention which illustrates all of the elements of a particular optical system for the miniaturized image generator including a light source, a spatial light modulator, an eyepiece a source imaging area, and a polarizing beam splitting cube for directing one polarization of light from the light source into the spatial light modulator and for directing the opposite polarization of light from the spatial light modulator to the eyepiece which directs the lip-t to the source imaging area forming a real image of the light source within the source imaging area.

Referring now to FIG. 2B, an alternative basic configuration of an overall display system designed in accordance with the present invention and generally designated by reference numeral 44 will be described. Display system 44 includes light source 28, collimating lens 34, eyepiece lens 36, and source imaging area 38 as describe above for FIG. 2A. However, in this embodiment of the present invention, a reflective type spatial light modulator 46 controlled by writing arrangement 32 is used instead of a transmissive spatial light modulator. As shown in FIG. 2B, a suitable and readily providable polarizing beam splitting cube 48 is positioned between spatial light modulator 46 and eyepiece lens 36. Also, light source 28 and collimating lens 34 are positioned to one side of polarizing beam splitting cube 48.

During the operation of basic display system 44 described above, light from light source 28, indicated by lines 49, is collected by collimating lens 34 and directed into polarizing beam splitting cube 48. The polarizing beam splitting cube reflects light of one polarization, for example S-polarized light, into spatial light modulator 46 and wastes light of the opposite polarization, for example P-polarized light, allowing it to pass through polarizing beam splitting cube 48. Spatial light modulator 46, controlled by writing arrangement 32, acts on the light of the one polarization (S-polarized light) directed into the modulator by converting certain portions of the light of the one polarization (S-polarized light) to light of the opposite polarization (P-polarized light) forming an overall pattern of modulated light that is reflected back into polarizing beam splitting cube 48. The polarizing beam splitting cube wastes light of the one polarization (S-polarized light) by reflecting it back toward light source 28 and allows the converted light of the opposite polarization (P-polarized light) to pass through polarizing beam splitting cube 48 into eyepiece lens 36 forming a real image of light source 28 at source imaging area 38. As described above, the real image of light source 28 is formed at source imaging area 38 because light source 28 is positioned optically a distance greater than one focal length of eyepiece lens 36 from eyepiece lens 36. This arrangement also produces a virtual image of the pattern of modulated light that is viewable from the source imaging area and viewing region 42. One specific novel arrangement for spatial light modulator 46 and writing arrangement 32 is disclosed in U.S. Pat. No. 5,748,164.

Figure 1:
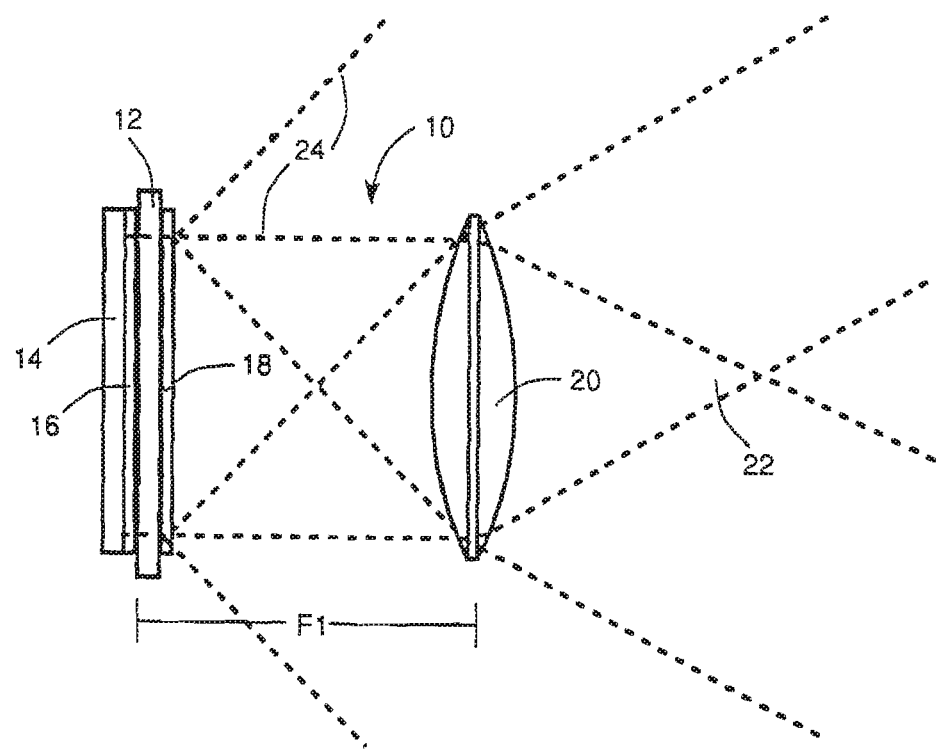
FIG. 1 is a diagrammatic side view of a prior art miniaturized image generating system.

As illustrated by FIG. 2B, the above described arrangement, which includes a reflective type spatial light modulator such as spatial light modulator 46, allows light source 28 to be moved away from spatial light modulator 46 without increasing the front to back length of the overall system as was shown in FIG. 2A. This system, designed in accordance with the present invention, folds the optical path such that the portion of the optical path in which light from the light source is directed into the spatial light modulator overlaps the portion of the optical path in which the light is directed from the spatial light modulator to the eyepiece lens. By overlapping the optical path as described, the same physical space is used for both of these purposes and therefore the length of the system is not increased relative to the prior art system described above and shown in FIG. 1. In the embodiment illustrated in FIG. 2B, this folding of the optical path is accomplished by positioning polarizing beam splitting cube 48 in the space between spatial light modulator 46 and eyepiece 36. Again, this does not increase the length of the system because, as shown in FIG. 1 and 2A, the eyepiece lens must be positioned approximately one focal length of the eyepiece lens away from the spatial light modulator which provides sufficient space for the polarizing beam splitting cube.

By moving light source 28 away from the spatial light modulator as specified by the present invention in order to form a real image of light source 28 at source imaging area 38, optical elements may be added to the system which direct the light from source 28 into spatial light modulator 46 in a controlled way. A variety of optical elements, which will be described in more detail hereinafter, may be used to direct the light from source 28 into the spatial light modulator and from the spatial light modulator so as to form a real image of light source 28 at source imaging area 38. As described above, these optical elements may also be arranged to allow a virtual image of the overall pattern of modulated light produced by the spatial light modulator, in other words a virtual image of the display, to be visible from source imaging area 38 and viewing region 42. Also as mentioned above, this arrangement of the present invention provides the substantial benefit of being able to direct a much larger percentage of the light generated by light source 28 into source imaging area 38 when compared with prior art systems. This avoids wasting light by directing light into regions other than viewing region 42, or in other words, regions from which a viewer viewing the display would not be able to view the entire virtual image of the pattern of modulated light produced by the spatial light modulator. Therefore, a system designed in accordance with the present invention more efficiently uses the light produced by the light source when compared with prior art image generating systems which reduces the power requirements of the overall system. Furthermore, a wide variety of different light sources may be used including less expensive light sources than prior art systems require.

Although the basic optical elements of the display system illustrated in FIG. 2B are functional, as the overall system is scaled down in size, it becomes more and more difficult to scale down the optical elements to the same degree. Also, even though the optical paths upstream and downstreams of the spatial light modulator overlap, the arrangement shown in FIG. 2B adds to the bulk of the system because light source 28 is positioned somewhat off to the side of the rest of the system. Furthermore, since a light source with a very small spatial extent is being used, the "exit pupil", that is the size of the real image of the source at the source imaging, area, becomes so small that normal movement of a viewer's eye and tolerances for exact positioning of the viewer's eye result in the viewer's eye, at times, being moved such that all or portions of the virtual image of the display are not viewable. Also, as the system is scaled down in size, the eye relief, that is the distance from the eyepiece lens to the viewer's eye, indicated by distance R in FIG. 2B, is reduced. In the case of a helmet mounted display, the desired eye relief is, for example, approximately 25 mm which allows enough space for a viewer wearing eyeglasses to comfortably use the display. At distances less than 25 mm this may become a problem where eye glasses are concerned. Both of these viewing characteristics, that is exit pupil and eye relief, are important to the functionality, of the system, and, along with the overall bulk of the optical components used, are major considerations when reducing the size of a miniaturized image generating system. As will be described in more detail hereinafter, the present invention provides a variety of novel arrangements which address these and other problems.

Figure 3:
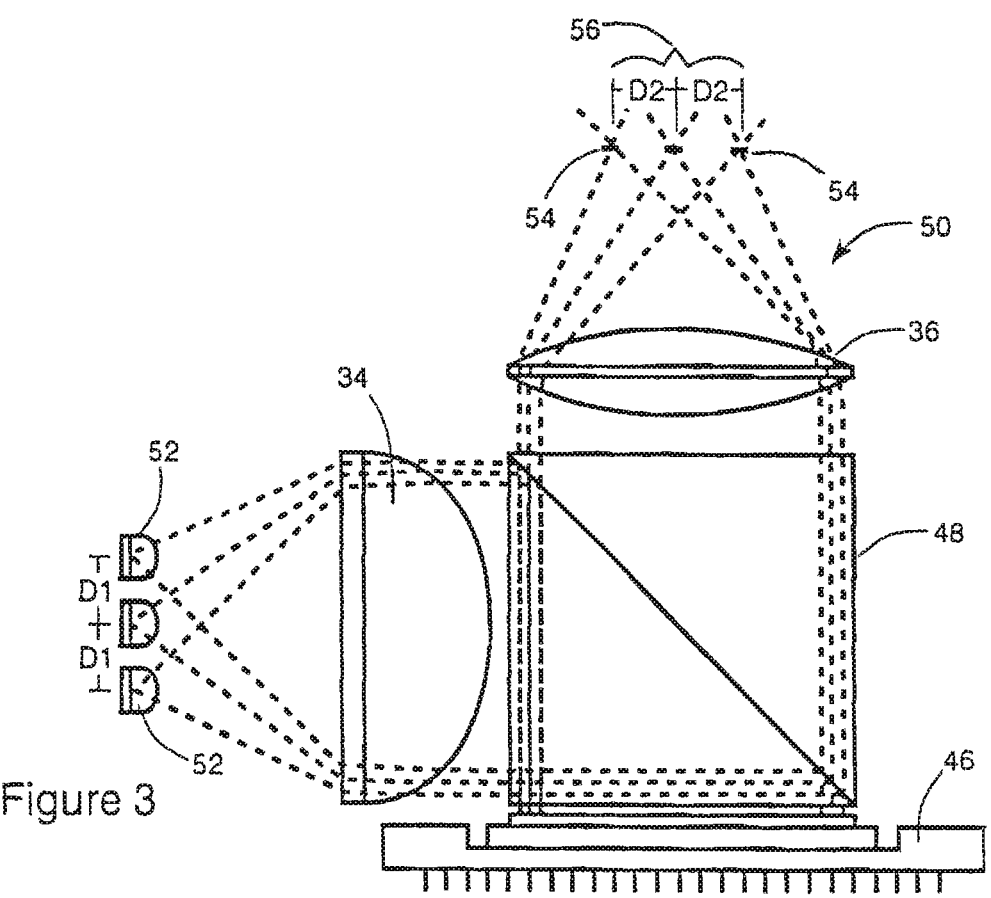
FIG. 3 is a diagrammatic side view of one embodiment of a miniaturized image generating system designed in accordance with the present invention including a plurality of light sources which, in combination with the other optics components, produce a corresponding real image of the plurality of light sources at the source imaging area.

Referring now to FIG. 3 which illustrates a miniaturized display system generally indicated by reference numeral 50, a first particular embodiment of the present invention will be described in detail. As shown in FIG. 3, miniaturized display 50 includes spatial light modulator 46, collimating lens 34, polarizing beam splitting cube 48, and eyepiece lens 36 as were described above for FIG. 2B. However, in accordance with the present invention, display 50 includes an array of or a plurality of individual light sources which are indicated by reference numeral 52. In this particular embodiment and in accordance with one aspect of the present invention, the array of light sources includes LEDs, specifically three rows of three LEDs. Light sources 52 are spaced apart so as to, in cooperation with the optics components, produce a real image of an equal array or plurality of the sources at source imaging areas 54. Although only three rows of three light sources are described, it should be understood that the array of light sources may include a wide variety of numbers of light sources depending on the specific requirements of the situation. Also, although the light sources have been described as LEDs, it should be understood that the present invention is not limited to LEDs but instead includes other forms of light sources including, but not limited to, laser diodes, cold cathode or field emitter cathodoluminescent sources and incandescent and flourescent lamps together with a switchable color filter such as Displayteck's RGB Fast Filter color filter. Furthermore, each of the light sources may be made up of a cluster of light sources such as several LEDs tiled together to form the light source. In a color version of this embodiment, this cluster of light sources includes light sources of different colors tiled together to form each light source.

Still referring to FIG. 3, light sources 52 are spaced apart by a specific distance D1 which produces real images of light sources 52 at source imaging areas 54 that are spaced apart by a specific distance D2 which can be easily calculated by those skilled in the optics art. Distance D1 is selected to be a distance which causes distance D2 to be a distance which is less than the diameter of a typical viewer's pupil, for example less than 3 mm, when the viewers pupil is adjusted to the brightness of the display. This allows the viewer to view the virtual image of the entire display so long as the pupil of the viewer's eye is within the overall source imaging area which includes all of source imaging areas 54 or within viewing region 56. For purposes of the present invention, this positioning of the images of the light sources such that the viewer is able to view the virtual image of the entire display so long as the pupil of the viewer's eye is within the overall source imagine area is defined as substantially filling the source imaging area. By producing a plurality of images as shown in FIG. 3, the overall source imaging area is enlarged. By controlling the distance D1 that the light sources are spaced apart, the spacing of the images is controlled and therefore the overall size of the source imaging area is controlled. Also, the overall source imaging area may be further enlarged by increasing the number of light sources making up the array of light sources. This array of light sources enlarges the overall source imaging area without increasing the size of the other optics components or the size of the overall display system. Therefore, the display system may, be scaled down in size without creating the problem of producing an exit pupil that is to small or, in other words, a source imaging area that has an area to small to be practically viewed as described above.

In a specific example comparing the system shown in FIG. 3 to the basic system shown in FIG. 2B, the light source images at the source imaging areas are magnified by the ratio of the eyepiece focal length to the collimating lens focal length when the light source is placed one focal length of the collimating lens from the collimating lens. With both the collimating lens and the eyepiece lens having approximately the same diameter, about equal to the display diagonal, and using conventional lens technology, the magnification factor would typically be difficult to make much larger than a factor of two while maintaining a focal length for the eyepiece that provides the desired eye relief. Using an LED 0.25 mm square as the light source and a magnification factor of 2, the corresponding image would be 0.5 mm square. Therefore, the system, shown in FIG. 2B would form an image at source imaging area 0.5 mm square. With a source imaging area this small and using a viewer's pupil diameter of 3 mm, for example, it is clear that the viewer's pupil would move out of the source imaging area during normal movement of the eye. However, using the arrangement designed in accordance with the present invention and shown in FIG. 3, a display of the same size using the same lenses and having each of the nine LEDs of the array spaced 1 mm apart, produces a source imaging area 4.5 mm square. This area includes the array of nine 0.5 mm square images spaced 2 mm apart. Also, using the same pupil diameter of 3 mm, the viewer's pupil would always be able to view at least one of the images as long as the pupil was positioned somewhere within the source imaging area. As mentioned above, this source imaging area would be further enlarged by increasing the number of light sources making up the array.

Figure 4:
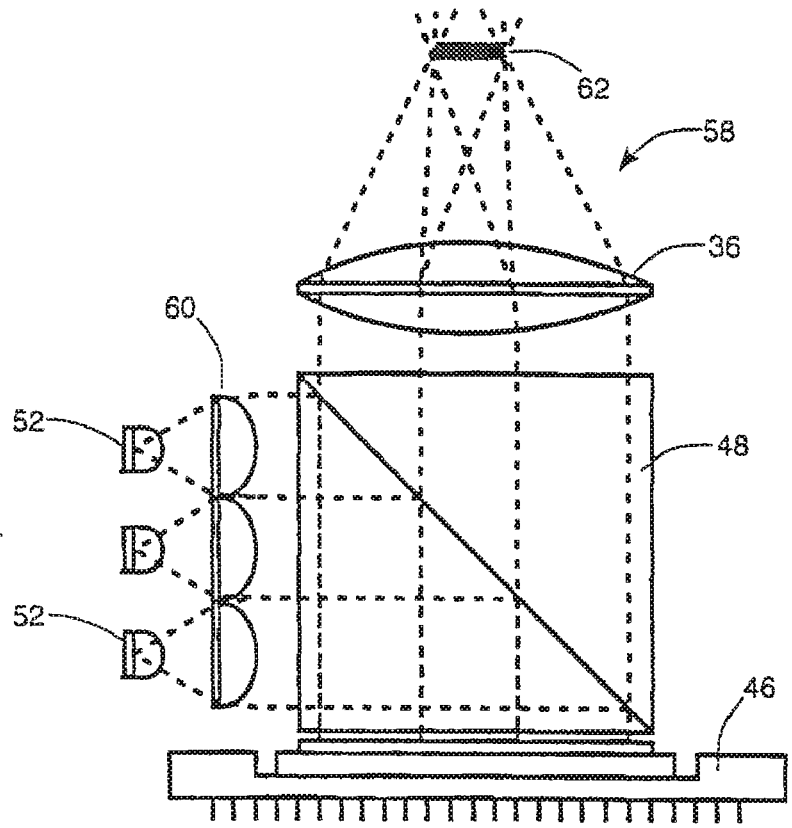
FIG. 4 is a diagrammatic side view of second embodiment of a miniaturized image generating system designed in accordance with the present invention including a plurality of light sources and a plurality of collimating lenses each of which is associated with a corresponding light source, which, in combination with the other optics components, produce a corresponding real image of the plurality of light sources at the source imaging area.

Referring to FIG. 4 which illustrates a miniaturized display system generally indicated by reference numeral 58, a second embodiment of the present invention will be described in detail. As shown in FIG. 4, miniaturized display 58 includes spatial light modulator 46, polarizing beam splitting cube 48, eyepiece lens 36, and the array of individual light sources 52 as were described above for FIG. 3. However, it, accordance with the present invention, display 58 includes an array or a plurality of individual collimating lenses which are indicated by reference numeral 60, each of which is associated with one of the light sources 52 and each of which has a focal length much shorter than would be possible using a single collimating lens as described above. In this particular embodiment, the array of collimating lenses includes three rows of three lenses. Each light source 52 is positioned one focal length of its associated collimating lens from its associated collimating lens. Each of these light sources 52 and their associated collimating lens 60, in cooperation with the other optics components, illuminate an associated portion of spatial light modulator 46 and produce a portion of an overall virtual image of the spatial light modulator illuminated by the associated light source. Therefore, an overall virtual image is formed which corresponds to overall spatial light modulator 46. Although only three rows of three light sources and their associated collimating lenses are described, it should be understood that the array of light sources and their collimating lenses may include a wide variety of numbers of light sources, which may be of different colors, and collimating lenses depending on the specific requirements of the situation. Furthermore, each of the light sources associated with each collimating lens may be made up of a cluster of light sources such as several LEDs tiled together to form the light source. In a color version of this embodiment, this cluster of light sources includes light sources of different colors all associated with one collimating lens.

By using the arrangement illustrated in FIG. 4 and as will be described in more detail immediately hereinafter, two advantages are provided. First, using a plurality of collimating lenses allows for a shorter optical path in the illuminator portion of the system reducing the required size and bulk of this portion of the system. Second, by using smaller diameter collimating lenses, with corresponding shorter focal lengths, the real image of sources 52 formed at a source imaging area 62 is magnified by a factor proportional to the ratio of the focal length of the eyepiece lens relative to the focal length of the collimating lens, which in this arrangement would be a significant magnification.

Figure 5A:
FIGS. 5A and 5B are diagrammatic side views illustrating the optical relationship between the collimating lenses and the eyepiece lenses of FIG. 2 and FIG. 4.
Figure 5B:
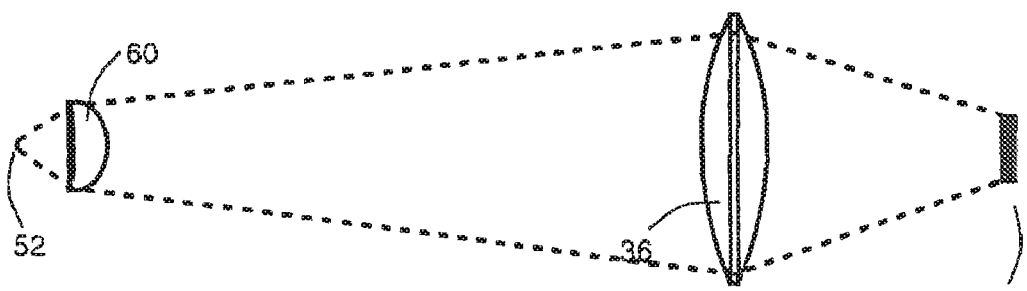

Referring to FIGS. 5A and 5B, a specific example of the above mentioned two advantages provided by the arrangement shown in FIG. 4 will be described. FIG. 5A illustrates the unfolded optical path of the light of the arrangement shown in FIG. 2B while FIG. 5B illustrates the unfolded optical path of the light for a single light source in the arrangement designed in accordance with the present invention and shown in FIG. 4. Using the same lens focal length ratios as were used in the previous examples, the arrangement shown in FIG. 5A results in a magnification factor of two. This is obtained by using eyepiece lens 22 having a focal length of 25 mm, the desired eye relief distance, and fasts collimating lens 34 with a 12.5 mm focal length. Using the same 0.25 mm square LED light source 28, the resulting magnified image at source imaging area 38 is 0.5 mm square as mentioned in the earlier example. However, as shown in FIG. 5B, because the diameter of the plurality of collimating lenses 60 in overall display 58 are much smaller, a much smaller focal length may be used. In this example, if the focal length of each of the collimating lenses is reduced by a factor of four to 3.125 mm, (keeping the focal length of the eyepiece at 25 nun this results in a magnification factor of 8 and an image at the source imaging area 62 of 2 mm. As mentioned above, because the focal length of collimating lenses 60 are reduced, light sources 52 may be moved in closer to the lenses, reducing the optical path length and the bulk of the illuminator portion of the overall display system. Furthermore, as mentioned above, it should be understood that the array of light sources and collimating lenses may have a wide variety of numbers of light sources and collimating lenses. As the number of the light sources and associated collimating lenses is increased, both of the above described advantages are further improved.

Figure 6:
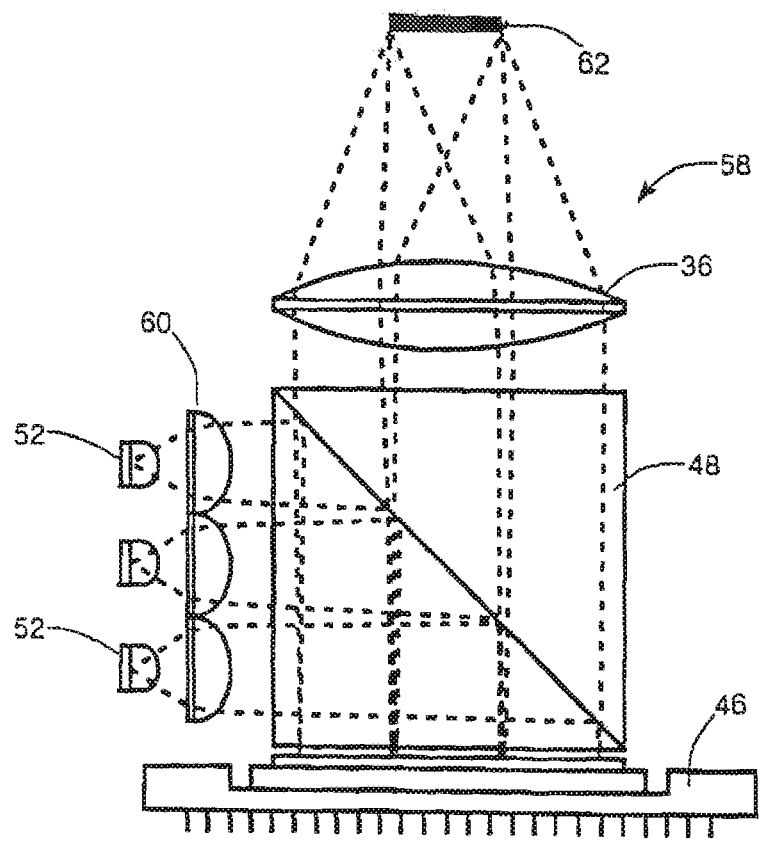
FIG. 6 is a diagrammatic side view of the image generator of FIG. 4 in which the light sources are positioned slightly closer to their associated collimating lens than one focal length so as to cause each collimating lens to direct light from its associated light source to the spatial light modulator in a slightly diverging manner.

Referring to FIG. 6, a variation of the embodiment illustrated in FIG. 4 will be described. In this variation, all of the components making up overall display 58 are the same with the only difference being the positioning of light sources 52 relative to collimating lenses 60. As shown in FIG. 6, light sources 52 are positioned slightly closer to collimating lenses 60 which causes the collimating lenses to direct light into spatial light modulator 46 in a slightly diverging manner. This results in several advantages in the overall display. First, since this causes the source imaging area to move further from eyepiece lens 22, this increases the eye relief slightly, providing a more comfortable viewing position. Second, since the magnification factor is determined by the ratio of how far the source imaging area is from the eyepiece lens which is increased in this case and how far the light source is positioned from the collimating lens which is reduced in this case, the magnification is increased. This further enlarges the real image of the source at the source imaging area. Third, since the light sources are moved even closer to the collimating lenses the size of the illuminator portion of the system is reduced still further as compared to the system of FIG. 4. And finally, the slightly diverging light from each light source creates overlaps of the light from each light source on spatial light modulator 46. This overlap improves the overall display by reducing dim spots in the virtual image of the display as well as reducing longitudinal vignetting, or in other words, reducing the problem of losing view of the display if the viewer's pupil is moved further away from the display than the designed eye relief distance. As an actual example, where the focal length of each collimating lens is 3.125 mm, to accomplish the desired divergence, the cooperating light source could be positioned 3 mm or less from its collimating lens.

The repositioning of the light source as described above can only be done to a limited extent. As light sources 52 are moved closer and closer to collimating lenses 60 (which now no longer actually collinate the light), the light is directed into polarizing beam, splitting cube 48 in more and more of a diverging manner. Since polarizing beam splitting cubes work most efficiently on light entering the cube at a specific angle (in this case collimated light from the light source entering normal to the cube surface) the polarizing beam splitting cube directs, or leaks, more and more light of the wrong polarization into the spatial light modulator thereby reducing the contrast of the display. Because of this limitation, light source 52 can only be moved a limited distance closer to collimating lens 60 without adversely effecting the contrast of the display.

Figure 7A:
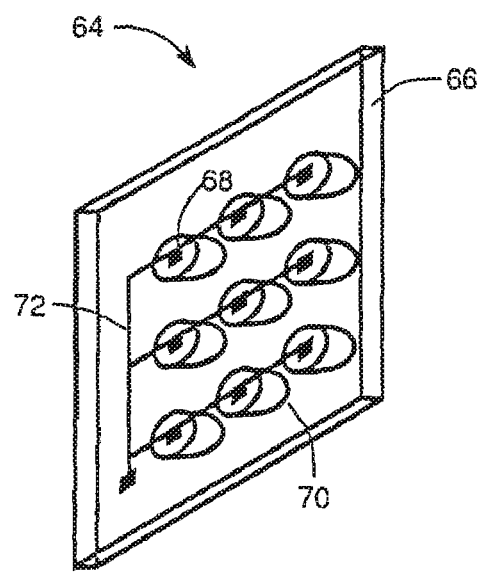
FIGS. 7A and 7B are diagrammatic perspective views of light source arrangements designed in accordance with the present invention for use in, for instance, the miniature image generator of FIG. 4.
Figure 7B:
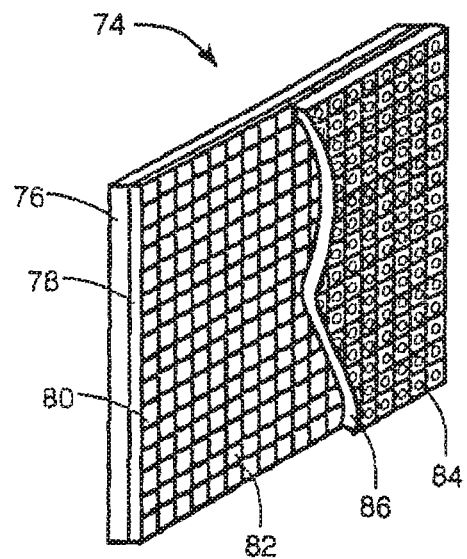

Referring to FIGS. 7A and 7B, two specific light source arrangements designed in accordance with the present invention will be described in detail. FIG. 7A illustrates a light source arrangement generally destinated by reference numeral 64 which includes a glass substrate 66. An array of light sources 68, such as LED die, are attached to glass substrate 66. In the particular embodiment shown, three rows of three LED die are attached to the glass substrate. An array of lenslets 70, each of which corresponds to an associated light source 68, are attached to glass substrate 66 directly above their associated light sources. Arrangement 64 also includes an array of electrically conductive leads 72 printed or otherwise attached to glass substrate 66 and adapted for connection with a suitable power supply to provide electrical power to each of light sources 68. In this arrangement, leads 72 may be provided as transparent leads made from, for example, indium-tin oxide. Although light source arrangement 64 is described as having only three rows of three light sources, it should be understood that the array of light sources may include a wide variety of numbers of light sources depending on the specific requirements of the situation. Also, although the light sources have been described as LEDs, it should be understood that the present invention is not limited to LEDs but instead includes other forms of light sources including but not limited to laser diodes, cold cathode or field emitter cathodoluminescent sources and incondescent and flourescent lamps together with a switchable color filter such as Displayteck's RGB Fast Filter color filter. Furthermore, each of the light sources may be made up of a cluster of light sources such as several LED die tiled together to form the light source. In a color version of this embodiment, this cluster of light sources includes light sources of different colors tiled together to form each light source. The focal length and positional arrangement between light sources 52 and lenses 60 described with respect to FIG. 6 may be maintained in arrangement 64 and arrangement 74 to be described immediately below.

Referring to FIG. 7B, an alternative embodiment of a light source arrangement designed in accordance with the present invention and generally designated by reference numeral 74 will be described. Light source arrangement 74 includes a substrate 76 having an LED wafer 7S attached to one surface. This LED wafer 78 is a relatively large portion of an LED wafer which is not cut into small individual die as is typically done in the manufacture of LEDs, but instead, is a continuous sheet of LED wafer material, in this particular embodiment approximately 25 mm square. A grid of electrically conductive leads 80 are formed on the surface of LED wafer 78. Leads 80 may be either transparent or opaque depending on the requirements of the application and are adapted to distribute electrical power from a suitable power supply over the entire surface of the wafer, substantially uniformly, such that when power is applied to the grid of leads, the entire LED wafer emits light of substantially uniform brightness. Leads 80 may b applied to wafer 78 using conventional screen printing or integrated circuit manufacturing techniques. Although light source arrangement 74 has been described as being 25 mm square, it should be understood that this arrangement may be used to provide continuous light sources of a wide variety of sizes. In fact, a plurality of light source arrangements using LED wafers as described immediately above may be tiled together to form very large light sources depending on the requirements of the situation.

Still referring to FIG. 7B, if collimated light is desired for the application in which light source 74 is to be used, the grid of electrically conductive leads 80 may be formed using an opaque material. This opaque grid of leads effectively divides the wafer into an array of individual LED wafer portions or individual LED light sources, one of which is indicated by reference numeral 82, with all of the LED wafer portions are immediately adjacent one another. For this embodiment, light source arrangement 74 further includes an array of collimating lenslets 84 overlaying the array of individual LED wafer portions 82 and formed within a single sheet 86. Each lenslet 84 is associated with a corresponding LED wafer portion 82 and is aligned with and positioned directly above its associated wafer portion. This arrangement provides a nearly continuous sheet of LED light sources which emit collimated light through their associated lenslets. Also, because this arrangement is very thin, it is an excellent light source for use in a miniaturized image generating system. In fact, using a light source arrangement such as arrangement 74 in an image generating system designed in accordance with the present invention essentially eliminates the additional bulk of the overall system due to positioning the light source arrangement to one side of the overall system as described above.

Although the light source arrangement described above has been described as being used in a miniaturized image generating system, it should be understood that this arrangement of and method for producing an LED wafer light source in a relatively large sheet is not limited to this specific application. Instead, the LED wafer light source of the present invention may be used in a wide variety of applications which require a thin, bright, evenly distributed light source.

Figure 8:
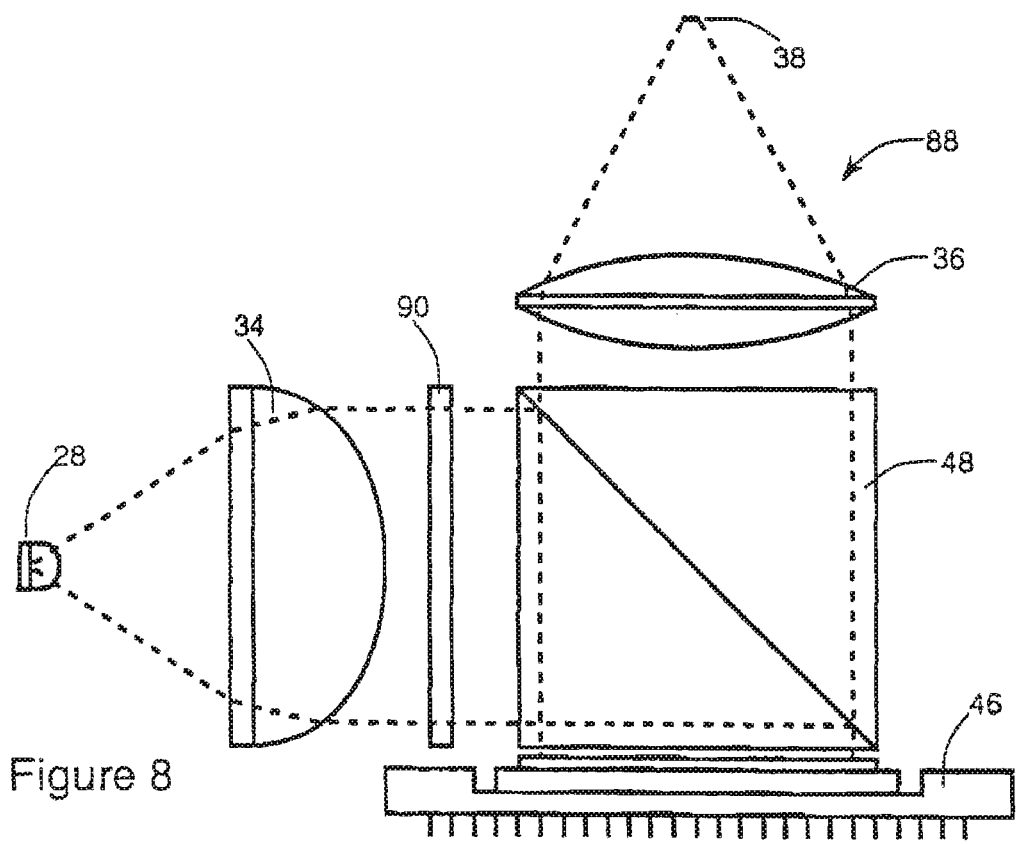
FIG. 8 is a diagrammatic side view of a third embodiment of a miniaturized image generating system designed in accordance with the present invention including an auxiliary polarizer positioned optically between the light source and the spatial light modulator.

Referring now to FIG. 8, another embodiment of an assembly for producing modulated light designed in accordance with the present invention and generally designated by reference numeral 88 will be described. Assembly 88 includes all of the components included in system 44 illustrated in FIG. 2B, that is, assembly 88 includes light source 28, spatial light modulator 46, source imaging area 38, collimating lens 34, polarizing beam splitting cube 48, and eyepiece lens 36. However, in accordance with the present invention, assembly 88 further includes an auxiliary polarizer 90 positioned optically between collimating lens 34 anti polarizing beam splitting cube 48. Polarizer 90 improves the efficiency at which the system directs light of only one polarization (in this case, for example, S-polarized light) into spatial light modulator 46.

Readily available polarizing beam splitting cubes, such as cube 48, are not 100% efficient at directing only light of one polarization (for example, S-polarized light) into spatial light modulator 46, in other words, cube 48 leaks some of the light of the opposite polarization (in this case P-polarized light) into the modulator. This is especially true if the light is not very well collimated and if the light includes a variety of wavelengths. The more collimated the light entering polarizing beam splitting cube 48 and the narrower the wavelength band of light entering polarizing beam splitting cube 48, the more effective it is at directing only light of one polarization (S-polarized light) into the spatial light modulator. By adding auxiliary polarizer 90, the vast majority of light allowed to enter polarizing beans splitting cube 48 is already of the one (S-polarized light) which is desired to be directed into spatial light modulator 46. Therefore the amount of light of the opposite polarization (P-polarized light) available to leak into spatial light modulator 46 is substantially reduced, increasing the overall efficiency at which assembly 88 directs only light of one polarization (S-polarized light) into spatial light modulator 46. This use of an auxiliary polarizer improves the contrast of the image generated by the overall image generating system and is equally applicable where multiple light sources are used.

Figure 9:
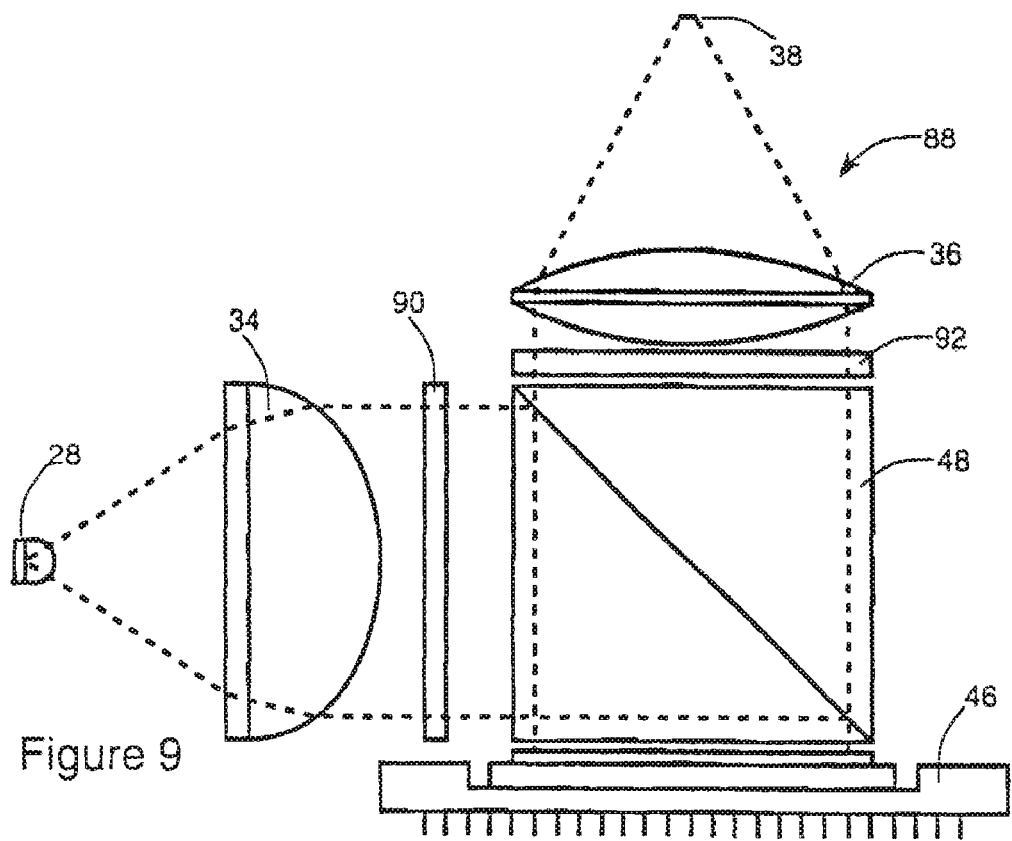
FIG. 9 is a diagrammatic side view of the miniaturized image generating system of FIG. 8 including an auxiliary analyzer positioned optically between the spatial light modulator and the source imaging area.

The system illustrated in FIG. 9 illustrates the assembly for producing modulated light shown in FIG. 8 which, in accordance with the present invention, further includes an auxiliary analyzer 92. Auxiliary analyzer 92 is positioned between polarizing beam splitting cube 48 and eyepiece lens 36 and further improves the contrast of the system by blocking any light of the one polarization (S-polarized light) which is intended to have been reflected away from eyepiece lens 36 by polarizing beam splinting cube 48 but leaked through the polarizing beam splitting cube because the cube is not 100% effective as described above. Using auxiliary polarizer 90 and auxiliary analyzer 92 provides good contrast in the overall image generated by the system while relaxing the requirements on polarizing beam splitting cube 48 such that a conventional and readily providable polarizing beam splitting cube may be used even if the light directed into the cube is directed into the cube in a slightly diverging manner and is made up of a variety of different wavelengths. If fact, using auxiliary polarizer 90 and auxiliary analyzer 92 allows a non polarizing beam splitter to be used in place of polarizing beam splitting cube 48, although this is not as effective as the system described above.

Figure 10:
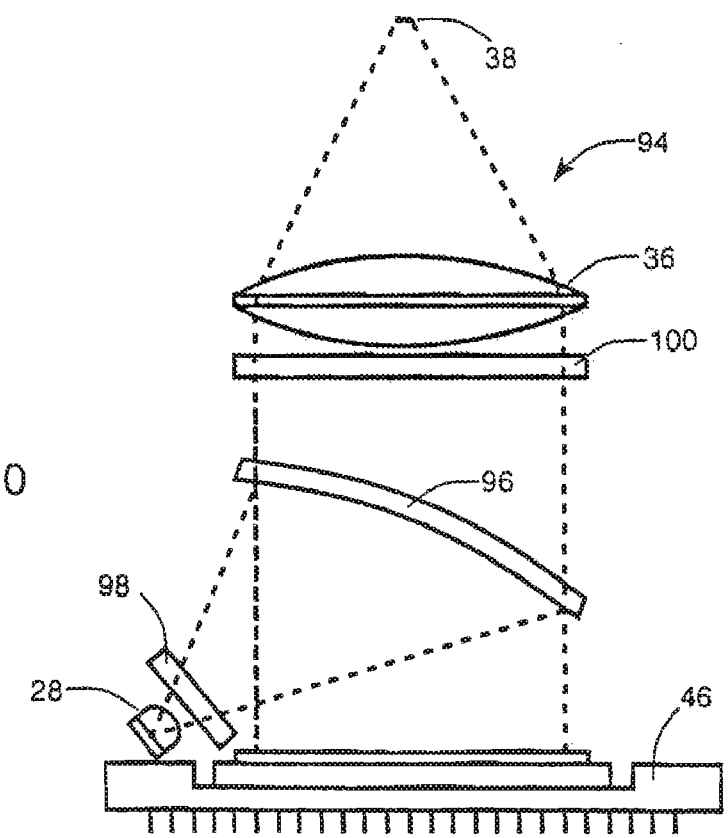
FIG. 10 is a diagrammatic side view of a fourth embodiment of a miniaturized image generating system designed in accordance with the present invention including an polarizer positioned optically between the light source and the spatial light modulator, an analyzer positioned between the spatial light modulator and the source imaging area, and a curved surface arrangement for directing the light from the light source to the spatial light modulator and transmitting the light from the spatial light modulator to the eyepiece which directs the light to the source imaging area.
Figure 11:
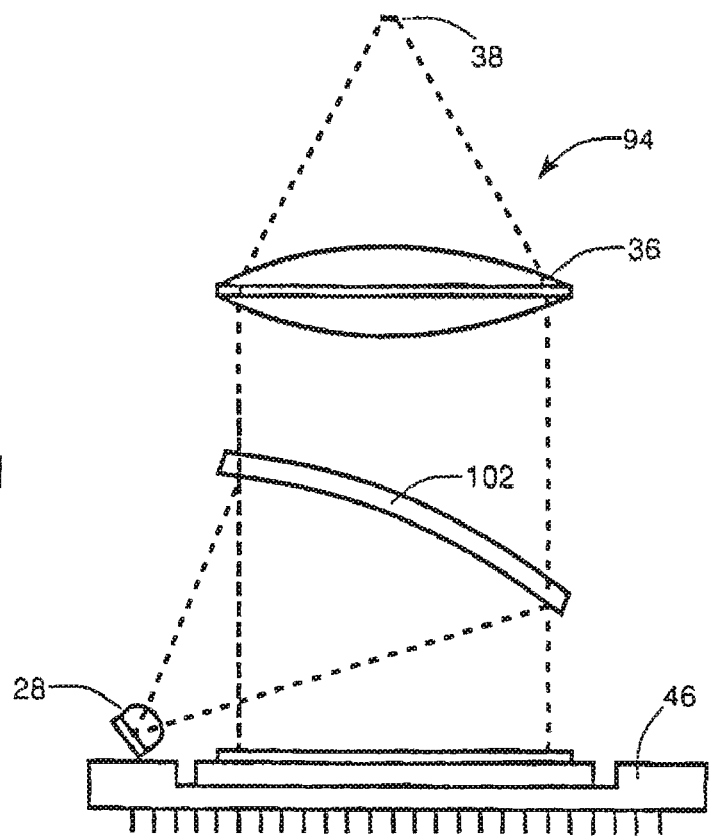
FIG. 11 is a diagrammatic side view of the miniaturized image generating system illustrated in FIG. 10 in which the polarizer and analyzer are formed as part of the curved surface arrangement.

Referring to FIGS. 10 and 11, another embodiment of a miniature display system generally designated by reference numeral 94 will be described. In accordance with the present invention, miniature display system 94 includes light source 28, spatial light modulator 46, source imaging area 38 and eyepiece lens 36 as have been described above for several other embodiments. However, in this embodiment, light source 28 is positioned adjacent to one of the edges of spatial light modulator 46 which dramatically reduces the size of the overall system by essentially eliminating the illuminator portion of the optical path that in the previous embodiments has been located off to one side of the axis normal to the spatial light modulator and eyepiece lens. Also, collimating lens 34 and polarizing beam splitting cube 48 of FIG. 2B are replaced by (i) a suitable and readily providable curved surface beam splitter 96 positioned between spatial light modulator 46 and eyepiece lens 36, (ii) an auxiliary, polarizer 98 positioned between light source 28 and curved surface beam splitter 96, and (iii) an auxiliary analyzer 100 positioned between curved surface beam splitter 96 and eyepiece lens 36. Curved surface beam splitter 96 is designed to reflect and collimate a portion of the light (in this case S-polarized light) from light source 28 after it has passed through auxiliary polarizer 98 directing this light into spatial light modulator 46. Curved surface beam splitter 96 also is designed to transmit a portion of the light directed from spatial light modulator 46 to eyepiece lens 36 (in this case both S-polarized light and P-polarized light). However, auxiliary analyzer 100 blocks light which has not been converted to the opposite polarization (in this case blocking S-polarized light) so that only light converted to the opposite polarization (P-polarized light) by spatial light modulator 46 is allowed to pass into eyepiece lens 36.

Alternatively, as illustrated in FIG. 11, curved surface beam splitter 96 is replaced with a curved surface polarizing beam splitter 102 which includes a surface coating which makes it a polarizing beam splitter. This eliminates the need for auxiliary polarizer 98 or auxiliary analyzer 100 or both polarizer 98 and analyzer 100. Both of the arrangements shown in FIGS. 10 and 11, in accordance with the present invention and as mentioned above, significantly reduce the bulk and weight of miniaturized display system 94. Also, since it is known in the prior art how to produce a curved surface beam splitter which would be suitable for these applications, all of the above described components are readily providable.

Figure 12:
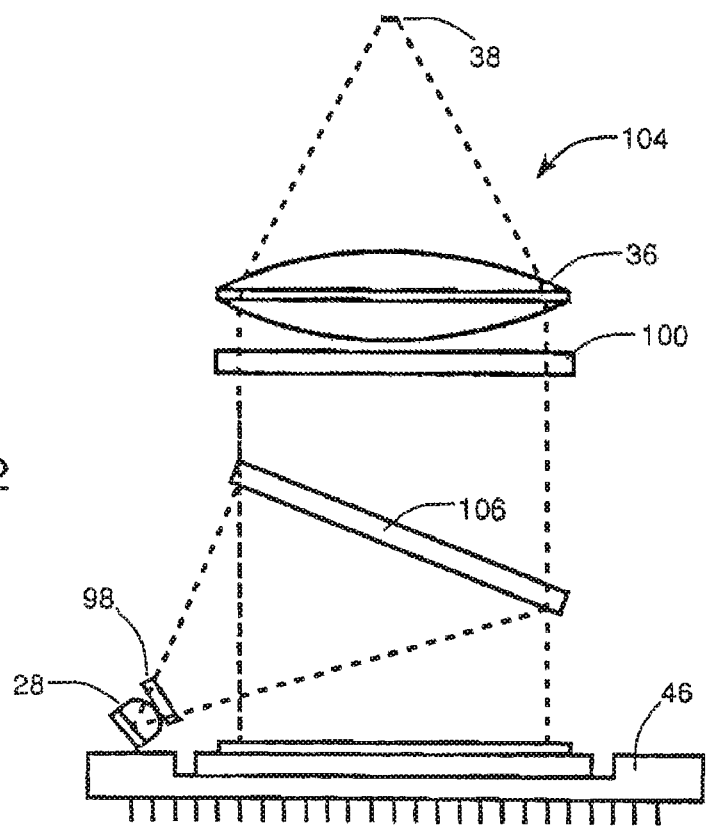
FIG. 12 is a diagrammatic side view of a fifth embodiment of a miniaturized image generating system designed in accordance with the present invention including a holographic polarizing beam splitter positioned optically between the light source and the spatial light modulator and between the spatial light modulator and the source imaging area.

Turning now to FIG. 12, another variation of the immediately above described miniaturized display system generally designated by reference numeral 104 will be described. Miniature display system 104 is identical to system 94 shown in FIG. 11 except that curved surface polarizing beam splitter 102 is replaced with a flat holographic polarizing beam splitter 106 which serves the same purpose. Holographic polarizing beam splitter 106 includes a diffraction grating which serves as the hologram which in turn serves as a beam splitter, a polarizer/analyzer, and as a collimator. It is known in the prior art how to produce a holographic polarizing beam slitter which would be suitable for these applications, and therefore as mentioned above for FIG. 11, all of the components required for display system 104 are readily providable. One example of such holographic diffusers are Physical Optics Corporation's Light Shaping Diffusers™. As described above for other embodiments of the present invention, auxiliary polarizer 98 and auxiliary analyzer 100 may be added to system 104. This would allow a holographic beam splitter which is not polarizing to be used in place of holographic polarizing beam splitter 106 if desired.

Figure 13:
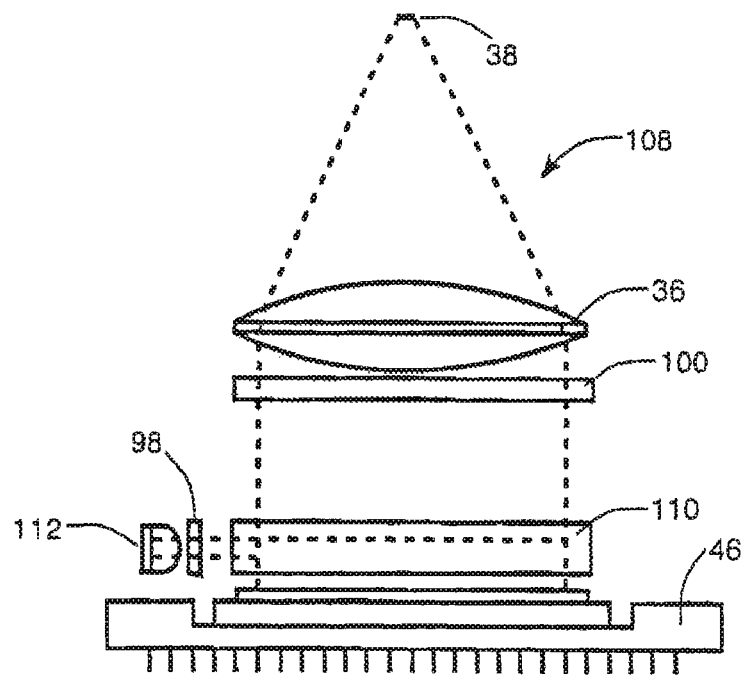
FIG. 13 is a diagrammatic side view of a sixth embodiment of a miniaturized image generating system designed in accordance with the present invention including an edge-illuminated holographic illuminator.

In another variation of the immediately above described embodiment, FIG. 13 illustrates a miniature display system designed in accordance with the present invention and generally designated by reference numeral 108. In system 108, holographic polarizing beam splitter 106 of FIG. 12 is replaced by an edge illuminated holographic optical element 110 and light source 28 is replaced with at least one laser diode 112 positioned at the edge of holographic optical element 110. In this arrangement, holographic optical element 110 is a flat element with a relatively small thickness and is positioned adjacent to the top surface of spatial light modulator 46 so that it covers the entire light modulating surface. Laser diode 112 directs light into at least one edge of holographic optical element 110 which is constructed with a refractive index grating. This refractive index refracts the light in a controlled way to evenly illuminate spatial light modulator 46. In one variation of this embodiment, holographic optical element 110 also acts as the polarizer and analyzer by directing only light of one polarization into spatial light modulator 46 and only allowing light of the opposite polarization to be transmitted through it from spatial light modulator 46. Alternatively, as described above for other embodiments, auxiliary polarizer 98 and auxiliary analyzer 100 may be added eliminating the need for holographic optical element 110 to act as the polarizer and analyzer.

As shown in FIG. 13, the size of miniature display system 108 is able to be reduced even further than any of the above described arrangements. First, because the laser diodes are positioned immediately adjacent to holographic optical element 110 the length of the optical path between these elements is minimized. Second, since holographic optical element 110 provides all the functions of polarizing beam splitting cube 48 of FIG. 2B, and because holographic optical element 110 is so thin, the optical path between spatial light modulator 46 and eyepiece lens 36 is also minimized.

Although in each of the above described embodiments illustrated in FIGS. 10-13, the light source has been illustrated as being a single light source, it should be understood that the light source may include a plurality of light sources. In fact, as described above for other embodiments, in color versions of these embodiments, the light source would include light sources of different colors. For example, in FIG. 13, light source 12 may include a plurality, of laser diodes of different colors.

Referring now to FIGS. 14A and 14B, another embodiment of a miniature display system designed in accordance with the present invention and generally designated by reference numeral 114 will be described. As shown in FIG. 14A, display 114 includes at least one light source 116, a polarizer 118, spatial light modulator 46 having a light receiving planar surface 120, an eyepiece lens 122, and an analyzer 124. In accordance with the present invention, light source 116 is positioned adjacent to the perimeter of eyepiece lens 122 and directs light through polarizer 118 such that light of one polarization (in this case S-polarized light) is directed into spatial light modulator 46 at an acute angle to an axis 126 normal to light receiving surface. Spatial light modulator 46 modulates the light converting certain potions of the light to the opposite polarization (P-polarized light) and directs the light into eyepiece lens 122. Eyepiece lens 122 is positioned off axis from axis 126 normal to the center of spatial light modulator 46 and therefore is a suitable and readily available asymmetrical lens. Eyepiece lens 122 directs the light from spatial light modulator 46 to source imaging area 128 through analyzer 124. Analyzer 124 blocks light which has not been converted to the opposite polarization (blocks S-polarized light) so that only the converted light is directed to source imaging area 128.

As shown in FIG. 14B, light source 116 may include a plurality of individual light sources positioned at discrete locations around the perimeter of the eyepiece lens. In this arrangement, a symmetrical lens, such as eyepiece lens 36, is positioned on axis with axis 126 normal to the center of spatial light modulator 46. As mentioned above for other embodiments, light source 116 used in both FIGS. 14A and 14B may be provided in a variety of specific forms such as, but not limited to, an LED, a laser diode, or a variety of other such devices. Furthermore, each of the light sources may be made up of a cluster of light sources such as several LEDs tiled together to form the light source. In a color version of this embodiment, this cluster of light sources includes light sources of different colors tiled together to form each light source.

Turning to FIGS. 15A and 15B, a variation of the miniature display system described immediately above will be described. As shown in FIG. 15A, miniature display system 130 includes all of the components described above for the miniature display system illustrated in FIG. 14A except that symmetrical eyepiece lens 36 is used instead of asymmetrical lens 122. However, in system 130 of FIG. 15A light source 116 and polarizer 118 are positioned between spatial light modulator 46 and eyepiece lens 36. This arrangement causes the problem that the viewer's view of the spatial light modulator is partially blocked by light source 116. However, if spatial light modulator 46 uses a weakly diffused mirror rather than a specular mirror, this problem is minimized. Alternatively, as shown in FIG. 15B, this problem is overcome by using a plurality of light sources 116 and cooperating polarizers positioned between spatial light modulator 46 and eyepiece lens 36. This plurality of light sources may be provided by an arrangement such as light source arrangement 64 described above and illustrated in FIG. 7A.

Figure 16:
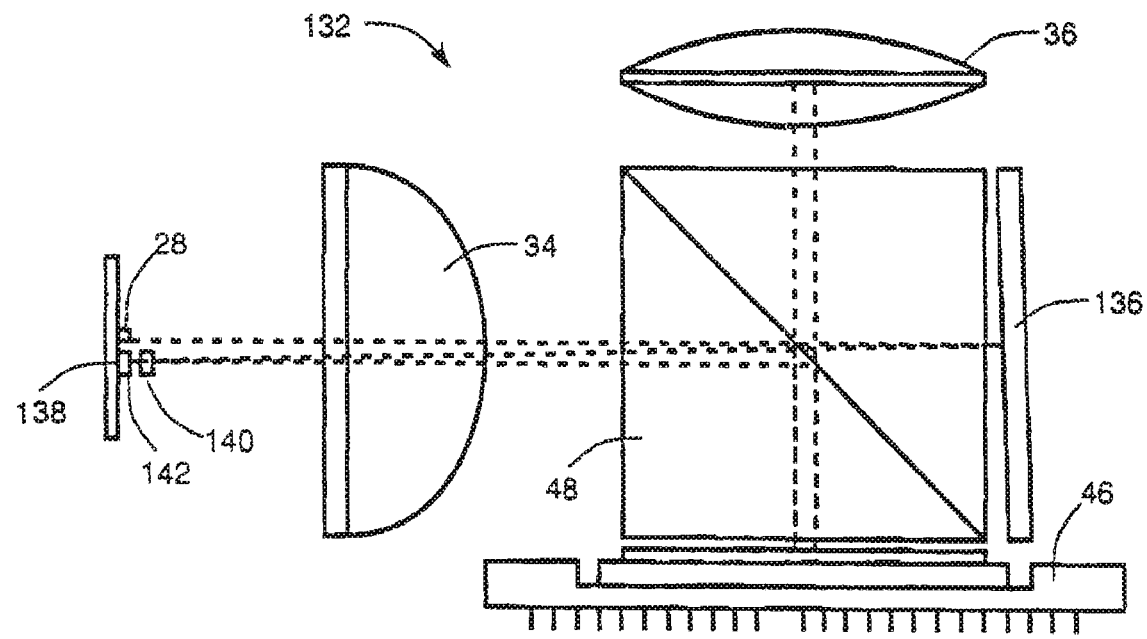
FIG. 16 is a diagrammatic side view of a ninth embodiment of a miniaturized image generating system designed in accordance with the present invention including an arrangement for converting light which is not directed into the spatial light modulator by the polarizing beam splitting cube to the opposite polarization and redirecting it back into the polarizing beam splitting cube.
Figure 17:
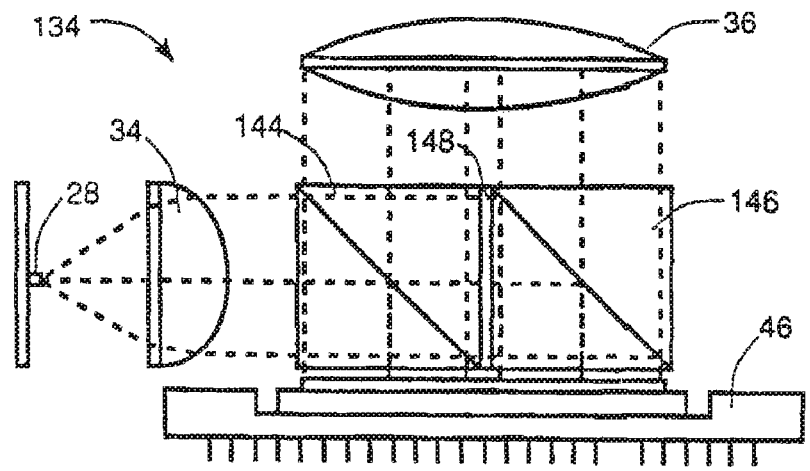
FIG. 17 is a diagrammatic side view of a tenth embodiment of a miniaturized image generating system designed in accordance with the present invention including a arrangement for converting light which is not directed into a first portion of the spatial light modulator by a first polarizing beam splitting cube to the opposite polarization and directing it into a second polarizing beam splitting cube associated with a second portion of the spatial light modulator.

Referring to FIGS. 16 and 17, two variations of an assembly for producing modulated light designed in accordance with the present invention and generally designated by reference numerals 132 and 134 will be described. As shown in FIG. 16, assembly 132 includes light source 28, spatial light modulator 46, collimating lens 34, polarizing beam splitting cube 48, and eyepiece lens 36 as described above for FIG. 2B. However, assembly 132 further includes a mirror 136 positioned on the opposite side of cube 48 relative to light source 28. Mirror 136 is positioned to reflect the light of the polarization which is transmitted through polarizing beam splitting cube 48, in this case P-polarized light, back to a point 138 immediately adjacent but to one side of light source 28. Assembly 132 also includes a quarter wave plate 140 and a mirror 142 positioned at point 138 which convert the light of the polarization which is transmitted by cube 48 (P-polarized light) to light of the opposite polarization (S-polarized light) and redirects the light back into cube 48. This arrangement doubles the amount of light used from light source 28 by not wasting the half of the light which is of the polarization that is transmitted by cube 48. Also, since mirror 136 reflects the light back to point 138 immediately adjacent to light source 28, this arrangement in effect provides a second light source which provides the benefits described above for the arrangement illustrated in FIG. 3 where multiple light sources are provided. Alternatively, if multiple light sources are used in this arrangement, it effectively doubles the number of light sources, again providing the above described advantages.

FIG. 17 illustrates an alternative assembly 134 to avoiding the wasting of light from light source 28. As shown in FIG. 17, polarizing beam splitting, cube 48 is replaced by a first and a second smaller polarizing beam splitting cubes, indicated by reference numerals 144 and 146 respectively, each of which is positioned over a corresponding portion of spatial light modulator 46. Also, mirror 136, mirror 142, and quarter wave plate 140 are replaced bad half wave plate 148 positioned between the two polarizing beam splitting cubes 144 and 146. In this arrangement, light from light source 28 is directed into first polarizing beam splitter 144 by collimating lens 34. Cube 144 directs light of one polarization, in this case S-polarized light, down into its associated portion of spatial light modulator 46 and allows light of the opposite polarization (P-polarized light) to pass through cube 144. Since half wave plate 148 is positioned between cube 144 and cube 146, the light which is transmitted through cube 144 (P-polarized light) is also transmitted through half wave plate 148 which converts the polarization of the light passing through it to the opposite polarization (S-polarized light). Therefore, the light entering cube 146 is essentially all light of the polarization (S-polarized light) which cube 146 directs down into its associated portion of spatial light modulator 46. This arrangement provides the benefit of not wasting light of ore polarization from light source 12 and also significantly reduces the bulk of the overall assembly by reducing the bulk of the polarizing beam splitting cubes.

Figure 18A:
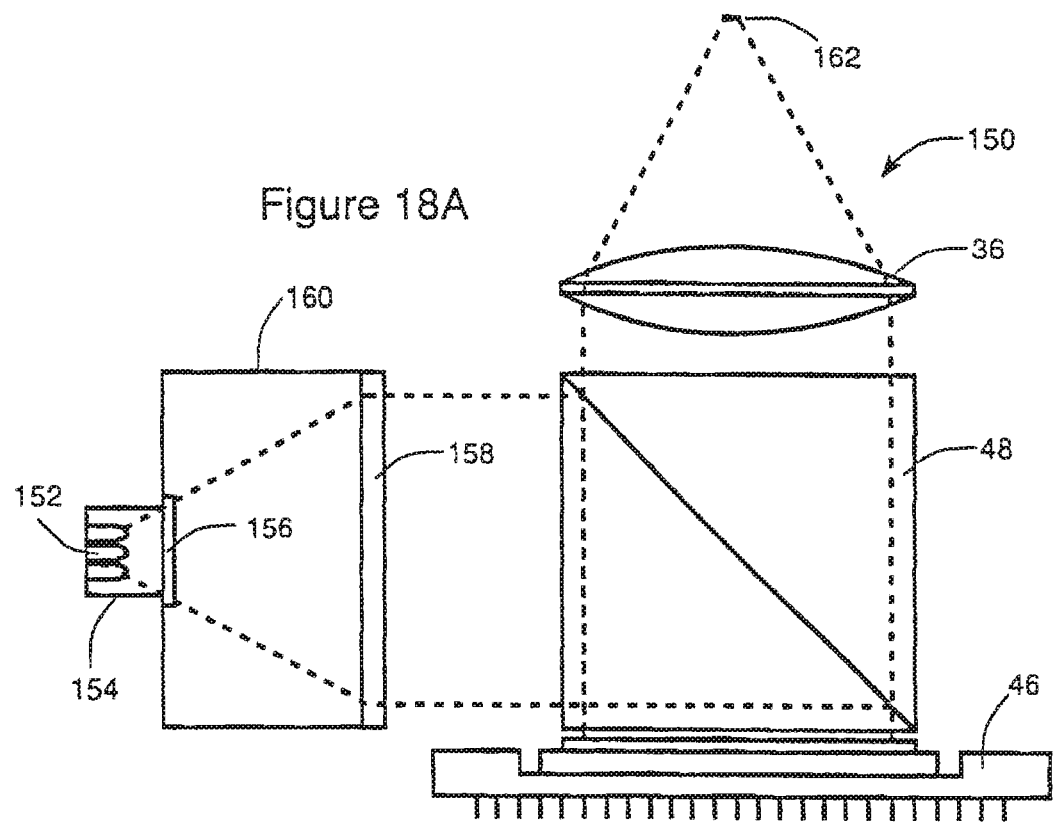
FIG. 18A-C are diagrammatic views of an eleventh embodiment of a miniaturized image generating system designed in accordance with the present invention.
Figure 18B:
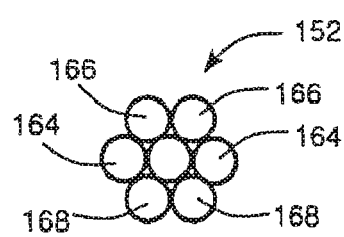
Figure 18C:
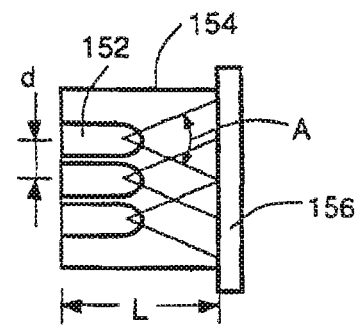

Referring to FIGS. 18A-C, another presently preferred embodiment of a miniaturized display system designed in accordance with the present invention and generally designated by reference numeral 150 will be described. As shown in FIG. 18A, display 150 includes spatial light modulator 46, polarizing beam splitting cube 48, and eyepiece lens 36 as have been described above for several other embodiments. However, display 150 further includes a light source 152 surrounded by a reflector 154; a diffusing plate 156 positioned between light source 152 and polarizing beam splitting cube 48; a Fresnel collimating lens 158 positioned between diffusing plate 156 and cube 48, a black plastic housing 160 surrounding and supporting light source 152, diffusing plate 156, and Fresnel lens 158; and a source imaging area 162. Fresnel lens 158 is used in this embodiment because it is less expensive, lighter weight, and is able to be constructed with a shorter focal length than a conventional lens of the same diameter.

In a monochrome version of this embodiment, diffusing plate 156 diffuses the light from light source 152, which is made up of a plurality of light sources. As shown best in FIG. 18C, plastic housing 160 supports diffusing plate 156 at a specific distance L away from light source 152 between light source 152 and Fresnel lens 158. Also as shown in FIG. 18C, the light emitting portions of the LEDs are spaced apart a certain distance d and emit light at a certain angle A. As will be described in more detail immediately hereinafter, this arrangement provides the best results when diffusing plate 156 is a weak diffuser and is placed at least a distance L from the light source. This distance L is determined by the equation $L \geq d/A$. This arrangement provides the proper mixing of the light source 152 so that the light from light source 152 provides a substantially uniform brightness of light throughout source imaging area 162.

In a color version of this embodiment, light source 152 is made up of a plurality of different colored LEDs, in this case, three green LEDs 164, two red LEDs 166, and two blue LEDs 168, all positioned immediately adjacent to one another. Reflector 154 surrounds all seven LEDs and helps direct the light from the LEDs toward Fresnel collimating lens 156. In the color version, diffusing plate 156 is positioned a distance L from light source 152 such that there is sufficient mixing of the light from the different color light sources so as to be able to achieve a substantially uniform white light throughout source imaging area 162.

When operating the color version of the miniaturized display system shown in FIG. 18A, light of each of the three colors is directed into spatial light modulator 46 of different times and modulated to produce the proper gray scale image desired for that particular color. The three colors are cycled at a frame rate or speed sufficiently fast to cause the viewer's eye to integrate the three different colored gray scale images into an integrated color image. Because the exact location of each of the three different colored LEDs making up light source 152 are spaced apart by distance d, if diffusing plate 156 were not included, each LED would form a corresponding image at source imaging area 162 which is spaced apart from the images formed by the other LEDs as described above for FIG. 3. This is not a problem for a monochromatic display since all of the images would be the same, however, with a color display this would result in shifts in the color of the perceived image with movement of the viewer's pupil. This problem is solved by placing diffusing plate 156 between light source 152 and Fresnel lens 158 as mentioned above.

The specific positioning and the diffusing strength of diffusing plate 156 have a significant impact on the performance of the system. As mentioned above, the best results occur when a weak diffuser is positioned at least a distance L away from light source 152. This positional relationship between the distance from the light source at which the diffuser is placed, the distance between the individual light sources, and the angle at which the light sources emit light causes enough overlap of each of the light sources at the diffusing plate such that when the light is weakly diffused, the images formed at source imaging area 162 are properly mixed minimizing the color registration problem described above.

Although the above described display system has been described including a single light source made up of seven LEDs adjacent to one another, it should be understood that the present invention is not limited to one such light source. Instead, the light source may be made up of a plurality of light sources as described for FIG. 3 with each light source including light sources of different colors. Also, although in the above described example seven LEDs were used, the present invention would apply regardless of the specific number of LEDs used and regardless of the specific type of light source used. For example, the LEDs may be replaced with laser diodes, cold cathode or field emitter cathodoluminescent sources, incondescent and flourescent lamps together with a switchable color filter such as Displayteck's RGB Fast Filter color filter, or any other appropriate light source. Furthermore, although the above described display has been described as including a single collimating lens, it should be understood that, as described for FIG. 4, this embodiment may incorporate a plurality of collimating lenses. In fact, the light source used in this embodiment may be provided by a light source as described above for FIG. 7A in which a plurality of light sources, such as LEDs, are attached to a substrate to form an overall light source.

Figure 19:
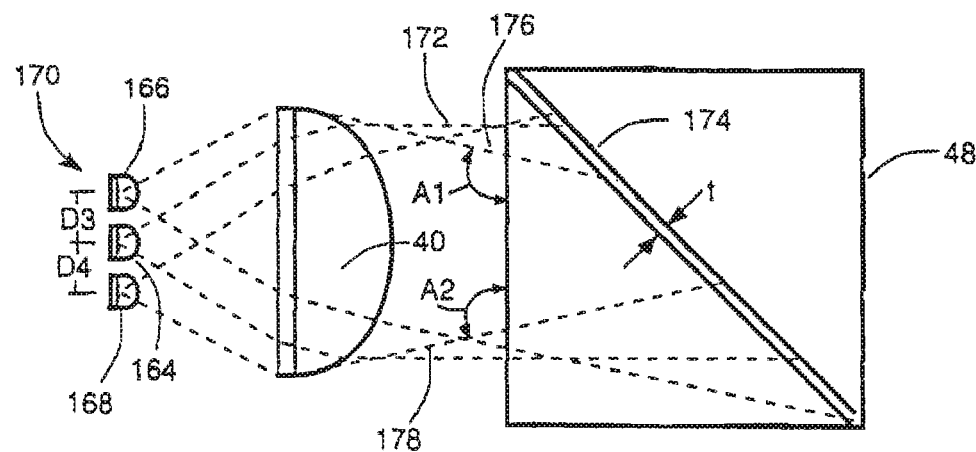
FIG. 19 is a diagrammatic side view of a portion of a miniaturized image generating system illustrating a plurality of light sources of three different colors, a collimating lens, and a polarizing beam splitting cube tuned to a first one of the three different colors of light, and in which the light sources of the other two colors are positioned to cooperate with the collimating lens to direct their light to the polarizing beam splitting cube at angles which improve the efficiency at which the polarizing beam splitting cube acts upon the light of the two other colors.

Referring to FIG. 19, another arrangement for improving the performance of a color version of an image generating system will be described. FIG. 19 illustrates a portion of a miniaturized image generating system including light source 170. As described above for FIG. 18A-C light source 170 includes green light source 164, red light source 166, and blue light source 168. As has been described above for several embodiments, this system includes a collimating lens 34 and a polarizing beam splitting cube 48. As mentioned above, polarizing beams splitting cubes are not 100% efficient, and their efficiency is dependent on the angle at which the light enters the cube and the wavelength of the light. As will be described immediately hereinafter and in accordance with the present invention, light sources 164, 166 and 168 can be strategically positioned to improve the performance of polarizing beam splitting cube 48.

As shown in FIG. 19, since light sources 164, 166, and 168 can not all be positioned at the focal point of collimating lens 34 and are slightly spaced apart, the light emitted from each light source is directed into polarizing beam splitting cube 48 at slightly different angles. In this example, green light source 164 is positioned at the focal point of lens 34 which collimates the green light, indicated by lines 172, and directs the light into cube 48 perpendicular to the cube. Also, in this example, polarizing beam splitting cube 48 is tuned to the wavelength of the green light emitted by source 164. That is, a polarizing beam splitting film 174 positioned diagonally within cube 48 is designed to have a certain thickness t that works most efficiently when light of the wavelength of source 164 is directed into cube 48 perpendicular to cube 48 as shown in FIG. 19.

Still referring to FIG. 19, red light source 166 is positioned above green light source 164 a certain distance D3. Red light emitted from light source 166 is collimated by lens 34 and directed into cube 48 at a particular angle A1 which is dependent on distance D3 as indicated by lines 176. Because polarizing beam splitting film 174 is positioned diagonally within cube 48 and because red light 176 is directed into cube 48 at angle A1, red light 176 must pass through a larger distance of film 174 than green light 172 since red light 176 intersects film 174 at a larger incident angle than green light 172. Therefore, since red light has a longer wavelength than green light, distance D3 may be selected to optimize angle A1 and cause red light 176 to intersect film 174 at an angle that improves the efficiency at which film 174 acts on red light 176. This same general approach may be used for blue light source 168 positioned a distance D4 below green light source 164. This causes blue light emitted from light source 168 to be collimated by lens 34 and directed into cube 48 at angle A2 as indicated by lines 178. Blue light 178 intersects film 174 at a smaller incident angle than green light 172 which results in blue light 178 passing through a smaller distance of film, 174 than green light 172. Since blue light has a shorter wavelength than green light, distance D4 may be controlled to improve the efficiency at which cube 48 acts on blue light 178.

Although the above example has been described using red, green, and blue light, it should be understood that the present invention is not limited to these specific colors. Also, although only three colors were described, the present invention would equally apply regardless of the number of colors of light being used. Furthermore, this general approach of strategically placing light sources of different colors to improve the efficiency of a polarizing beam splitting cube would equally apply to other embodiments which replace the polarizing beam splitting cube with other elements. For example, this general approach has particular significance for the embodiment of the present invention shown if FIG. 12 where the polarizing beam splitting cube is replaced with an edge illuminated holographic optical element.

Although only several specific embodiments of the present invention have been described in detail it should be understood that the present invention may be embodied in many other specific forms without departing from the spirit or scope of the invention. For instance, each of the inventive features of the various embodiments described may be combined in a wide variety of ways. As mentioned above, although most of the embodiments described used LEDs as the light source, it should be understood that a variety of types of light sources may be used in place of the LEDs such as laser diodes, cold cathode or field emitter cathodoluminescent sources, incondescent and flourescent lamps together with a switchable color filter such as Displayteck's RGB Fast Filter color filter, and a variety of other light sources. Also as mentioned above, although many of the embodiments were described as including individual light sources, such as LEDs, it should be understood the these light sources may be made up of a cluster of light sources tiled together to form the light source and the cluster of light sources may include light sources which emit light of different colors thereby providing a color version of the system. Furthermore, although a polarizing bean splitting cube has been used in several examples, this is not necessarily a requirement of the present invention. Other beam splitters may be used in combination with an auxiliary polarizer and an auxiliary analyzer. However, applicants have found that when using a spatial light modulator which modulates light by changing the polarization of the light, a polarizing beam splitter is more efficient than other beam splitters even when auxiliary polarizers and analyzers are used because the polarizing beam splitter only wastes light of one polarization.

Therefore, the present examples are to be considered as illustrative and not restrictive, and the invention is not to be limited to the details given herein, but may be modified within the scope of the appended claims.

What is claimed:
1. A display system, comprising:
an LED illuminator that provides light of at least three colors; and
an array of pixels that are illuminated by the LED illuminator, the pixels being switchable between optical states, in approximately 2 milliseconds or less;
wherein the array of pixels and the LED illuminator are controlled to sequentially display first an image of one of the at least three colors, followed by an image of a second one of the at least three colors, followed by an image of a third one of the at least three colors, in order to form a color gray-scale image.

2. A display system as defined in claim 1, wherein the array of pixels are part of a microdisplay.

3. A display system as defined in claim 2, wherein the microdisplay is a reflective microdisplay.

4. A display system as defined in claim 2, wherein the microdisplay is a liquid-crystal microdisplay.

5. A display system as defined in claim 2, wherein the microdisplay is a ferroelectric liquid-crystal microdisplay.

6. A display system as defined in claim 1, wherein the LED illuminator includes 3 LEDs.

7. A display system as defined in claim 6, wherein the LED illuminator includes a red LED, a green LED, and a blue LED.

8. A display system as defined in claim 1, further including an optical element to focus the light from the pixels.

9. A display system as defined in claim 1, further including an optical element to create a magnified image of the pixel array.

10. A display system, comprising:
an LED illuminator that provides light of at least three colors;
an array of pixels that are illuminated by the LED illuminator, the pixels being switchable between optical states, in approximately 2 milliseconds or less; and
an optical element to create a magnified image of the pixel array;
wherein the array of pixels and the LED illuminator are controlled to sequentially display color gray-scale images;
wherein the optical element includes an eyepiece lens.

11. A display system as defined in claim 1, further including optical elements that create a real image of at least a portion of the LED illuminator from the light provided by the illuminator.

12. A display system as defined in claim 11, wherein the real image is created from light that has passed through or been reflected by the array of pixels.

13. A display system as defined in claim 3, wherein the microdisplay is a liquid-crystal microdisplay.

14. A display system as defined in claim 13, wherein the microdisplay is a ferroelectric liquid-crystal microdisplay.

15. A display system as defined in claim 3, wherein the array of pixels is embodied on a semiconductor substrate.

16. A display system as defined in claim 1, wherein the array of pixels change their optical state without mechanical motion.

17. A display system as defined in claim 1, wherein voltages applied to the pixels in the array of pixels to control the optical state thereof are 5 volts or less.

18. A display system as defined in claim 1, wherein the array of pixels includes rows of pixels and wherein the rows have a pitch of 10 μm or less.

19. A display system as defined in claim 1, wherein at least a portion of the time that the optical state of the pixels is changed, the change is made while the illuminator is illuminating the pixels.

20. A display system as defined in claim 1, wherein the controlling is performed in such a way that at least some of the pixels switch between optical states while illuminated.

21. A display system as defined in claim 1, wherein the pixels are switchable between electrical states and wherein the optical state of each pixel is determined solely by its present electrical state.

22. A display system as defined in claim 21, wherein each pixel is switchable between only two electrical states.

23. A display system, comprising:
an LED illuminator that provides light of at least three colors; and
an array of pixels that are illuminated by the LED illuminator at least approximately 50 percent of the time that the display system is operating;
wherein the array of pixels and the LED illuminator are controlled to sequentially display first an image of one of the at least three colors, followed by an image of a second one of the at least three colors, followed by an image of a third one of the at least three colors, in order to form a color gray-scale image.

* * * * *